United States Patent
Sugihara et al.

(10) Patent No.: US 8,337,015 B2
(45) Date of Patent: Dec. 25, 2012

(54) SPECTACLES-MOUNTED DISPLAY DEVICE

(75) Inventors: Ryohei Sugihara, Machida (JP); Seiji Tatsuta, Hachioji (JP); Yoichi Iba, Hachioji (JP); Koichi Takahashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 187 days.

(21) Appl. No.: 12/870,406

(22) Filed: Aug. 27, 2010

(65) Prior Publication Data

US 2011/0051076 A1 Mar. 3, 2011

(30) Foreign Application Priority Data

Aug. 31, 2009 (JP) ................................ 2009-200921

(51) Int. Cl.
*G02C 1/00* (2006.01)

(52) U.S. Cl. .............................. 351/158; 345/7; 359/631

(58) Field of Classification Search .................... 351/41, 351/119, 121, 158; 345/7, 8; 349/11; 359/630, 359/631
See application file for complete search history.

(56) References Cited

U.S. PATENT DOCUMENTS

| | | | |
|---|---|---|---|
| 3,936,605 A * | 2/1976 | Upton | 704/271 |
| 5,886,822 A | 3/1999 | Spitzer | |
| 6,023,372 A | 2/2000 | Spitzer et al. | |
| 6,987,620 B2 * | 1/2006 | Nagaoka | 359/630 |

FOREIGN PATENT DOCUMENTS

| | | |
|---|---|---|
| JP | 05-303056 A | 11/1993 |
| JP | 2006-209144 A | 8/2006 |
| WO | WO 98/15868 A1 | 4/1998 |
| WO | WO 99/23525 A1 | 5/1999 |

* cited by examiner

*Primary Examiner* — Huy K Mai
(74) *Attorney, Agent, or Firm* — Holtz, Holtz, Goodman & Chick, PC

(57) ABSTRACT

A spectacles-type image display device having an image output unit that includes a display element that displays images and is disposed on a spectacle frame and a reflection unit that is disposed adjacent to at least one of spectacle lenses and reflects the image light that is output from the image output unit toward the eyeball so that the viewer can see a virtual image of the image is provided. The reflection unit is a reflection member having a positive refractive power and an effective luminous flux that is output from the image output unit and reaches the eyeball of the viewer is configured so that the width of the luminous flux perpendicular to an optical axis is minimum at the reflection unit with respect to the optical axis cross-section parallel to an incident surface of the optical axis relative to the reflection unit.

21 Claims, 21 Drawing Sheets

FIG. 2
(a)
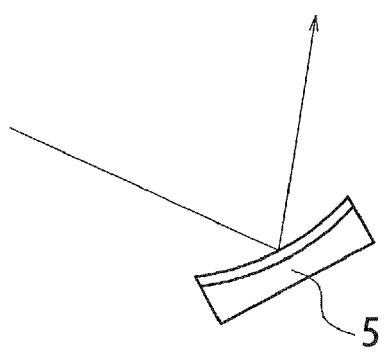
(b)
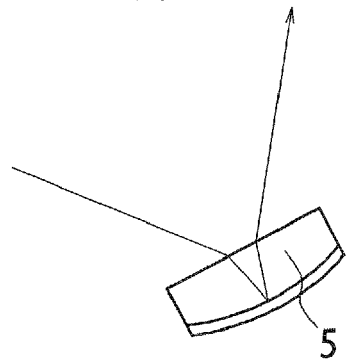
(c)
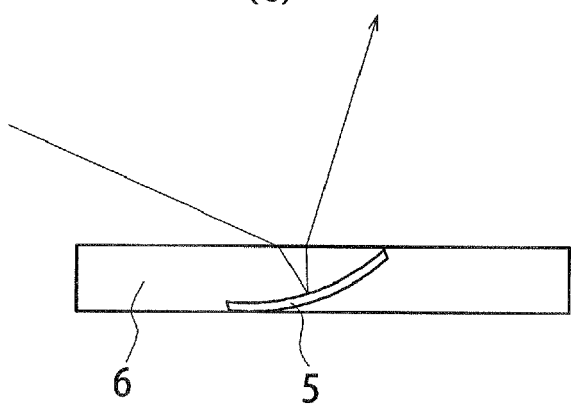
(d)
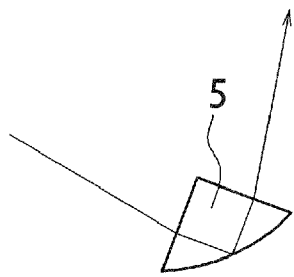

FIG. 9
(a)
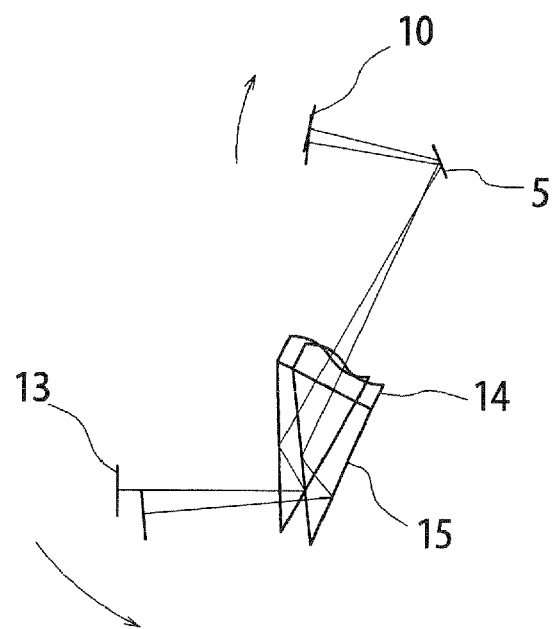
(b)
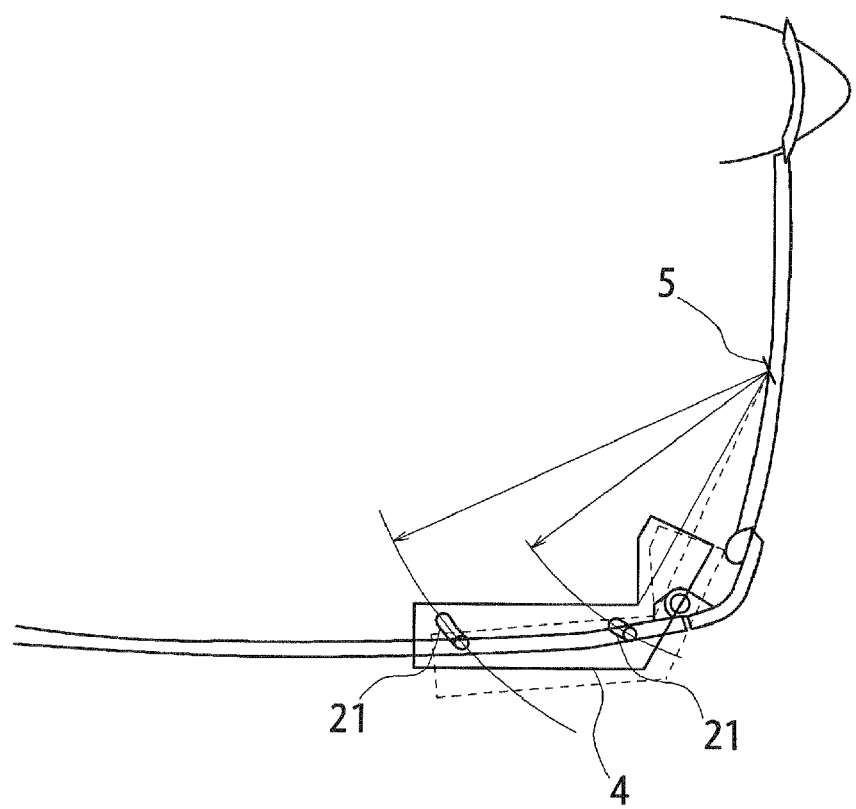

FIG. 10
(a)
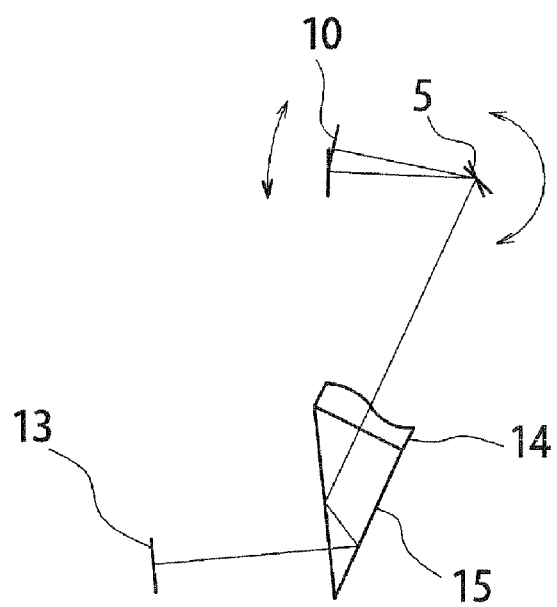
(b)
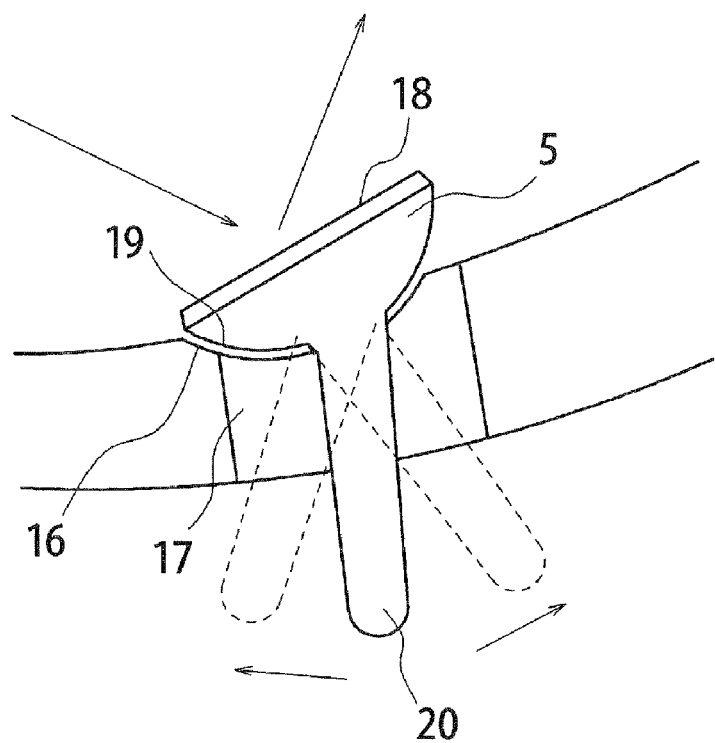

FIG. 11
(a)
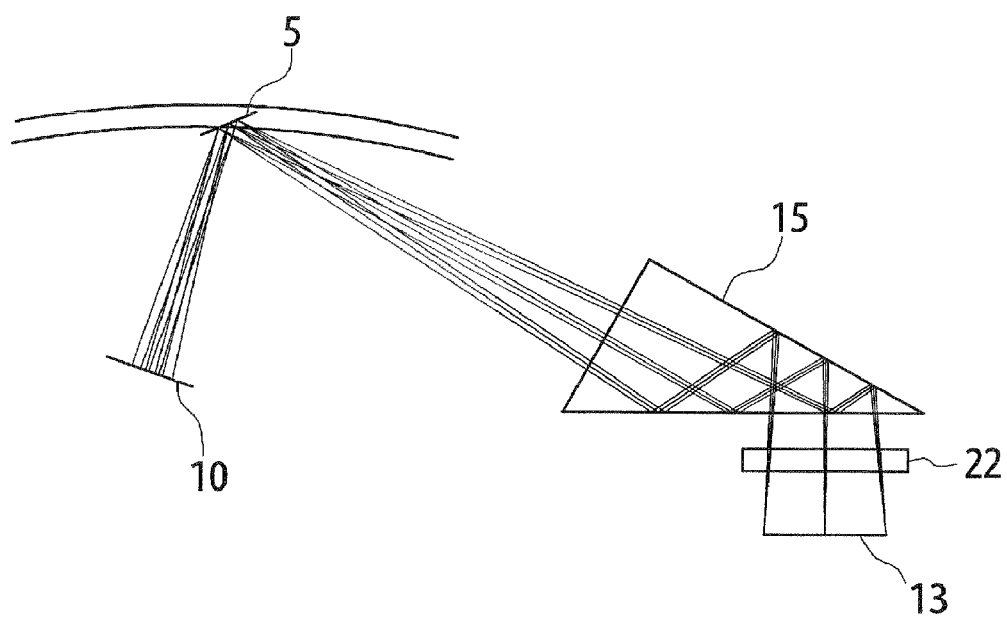
(b)
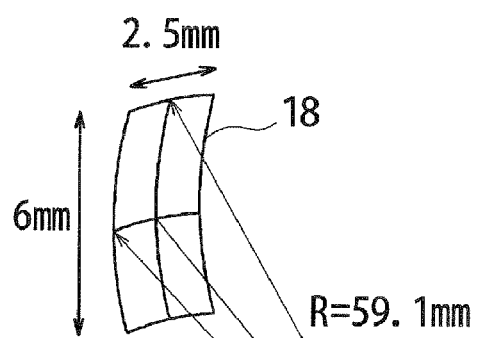

SPECTACLES-MOUNTED DISPLAY DEVICE

CROSS-REFERENCE TO RELATED APPLICATION

The present application claims priority from Japanese Application No. 2009-200921 filed on Aug. 31, 2009, the content of which is incorporated herein by reference.

FIELD OF THE INVENTION

The present invention relates to spectacles-type image display devices.

BACKGROUND OF THE INVENTION

Conventionally, as a spectacles-type image display device, for example, a device that includes an image output unit held on the temple side of spectacles and an eyepiece optical unit held adjacent to a lens of spectacles is suggested. Such spectacles-type image display device is configured so that the image light of electronic image to be displayed that is output from the image output unit is incident on an eyeball of a viewer through an eyepiece optical unit so that the viewer can see the image. In such spectacles-type image display device, the electronic image and the background image that transmits a spectacle lens are normally superimposed and displayed on an eyeball (what is called a see-through display).

As such technology, a device having a concave mirror that obstructs the front view and a plurality of projection lenses (see, for example, JP5303056 (A)) and a device provided with a hologram element disposed on each spectacle lens (see, for example, JP2006209144 (A)) are known. In addition, as such spectacles-type image display device, a device configured to hold an image output unit by a spectacle frame and the like to allow the image light to enter from outside the spectacle lens (see, for example, JP2001522064 (T)) and a device that constitutes an optical path for allowing the image light to enter in each spectacle lens (see, for example, JP2000511306 (T)) are known.

SUMMARY OF THE INVENTION

A spectacles-type image display device according to the present invention includes an image output unit having a display element that displays an image and is disposed on a frame of spectacles and a reflection unit that is disposed adjacent to at least one of spectacle lenses and is configured, when a viewer wears the spectacles, to reflect image light that is output from the image output unit toward an eyeball of the viewer so that the viewer can see a virtual image of the image, wherein the reflection unit is a reflection member having a positive refractive power, and an effective luminous flux that is output from the image output unit and reaches the eyeball of the viewer is configured so that a width of the effective luminous flux perpendicular to an optical axis is the smallest at the reflection unit with respect to an optical axis cross-section (a cross-section including an optical axis) parallel to an incident surface of the optical axis with respect to the reflection unit. That is, in an optical system of the spectacles-type image display device of the present invention, the reflection member functions substantially as an aperture stop. In other words, an exit pupil position with respect to the optical axis cross-section parallel to the incident surface can be a reflection member.

It is preferable that the smallest width of the cross-section perpendicular to the optical axis is smaller than 4 mm, which is an average pupil diameter of human, Further, it is preferable that, with respect to a reflection surface of the reflection member, the width in a direction parallel to the incident surface is smaller than the width in a direction perpendicular to the incident surface.

In addition, it is preferable that the display element is in the shape of rectangular and is disposed so that longitudinal direction of the rectangular shape corresponds to the minimum width direction of the reflection surface of the reflection member. In other words, the display element is laterally long even though the reflection member is vertically long.

Further, the reflection surface of the reflection member is represented as Rx>Ry, wherein the curvature radius perpendicular to the incident surface is Ry and the curvature radius parallel to the incident surface is Rx. That is, the reflection member is what is called, a toroidal mirror.

In addition, it is preferable that the reflection surface of the reflection member is a free-form surface. That is, the reflection member is, what is called, a free-form surface mirror.

Further, with respect to the effective luminous flux that is output from the image output unit and reaches the eyeball of the viewer, a pupil position in the lateral direction, which is an exit pupil position with respect to the optical axis cross-section parallel to the incident surface of the reflection member is located near the reflection member, and a pupil position in the longitudinal direction, which is an exit pupil position with respect to the optical axis cross-section perpendicular to the incident surface of the reflection member is located closer to a pupil of eyeball of the viewer than the pupil position in the lateral direction. In other words, the reflection member functions as an aperture stop with respect to the optical axis cross-section parallel to the incident surface, but it does not function as an aperture stop with respect to the optical axis cross-section perpendicular to the incident surface.

In addition, it is preferable that the reflection member is embedded in the spectacle lens.

Further, it is preferable that the image output unit is rotatably held around the reflection surface of the reflection unit.

In addition, it is preferable that the reflection unit is rotatably held with a rotation axis that lies in the reflection surface of the reflection member.

Further, it is preferable that a deviation prism is provided between the display element and the reflection unit.

Further, it is preferable that the display element is disposed to face the forward direction of the viewer, and the light ray output from the display element is incident on the deviation prism, is deflected by 50° to 70° and exits toward the reflection unit.

In addition, it is preferable that the deviation prism is held by an endpiece of the spectacles, the display element is held by a temple of the spectacles and the display element is movable and adjustable in the direction perpendicular to a display surface.

Further, it is preferable that the deviation prism is held by an endpiece of the spectacles, the display element is held by a temple of the spectacles and the display element is movable and adjustable in the direction parallel to a display surface.

In addition, it is preferable that a longitudinal aberration correction lens for correcting longitudinal aberration caused by eccentricity of the reflection unit is disposed between the display element and the reflection unit.

Further, it is preferable that the longitudinal aberration correction lens surface is in the shape of free-form surface.

In addition, it is preferable that the longitudinal aberration correction lens is integrated in a deviation prism.

Further, it is preferable that the display element is an organic EL.

In addition, it is preferable that the display element is disposed on a position where the projection cross-section with respect to the front direction of the viewer does not cover a pupil of the viewer.

BRIEF DESCRIPTION OF THE DRAWING

FIGS. 2(a), 2(b), 2(c), 2(d) are diagrams illustrating examples of a reflection unit used for carrying out the present invention;

FIGS. 9(a) and 9(b) are diagrams illustrating an example of interpupillary adjustment in accordance with the second embodiment of the present invention;

FIGS. 10(a) and 10(b) are diagrams illustrating another example of interpupillary adjustment in accordance with the second embodiment of the present invention;

FIGS. 11(a) and 11(b) are diagrams schematically illustrating a spectacles-type image display device in accordance with a third embodiment of the present invention;

DESCRIPTION OF THE PREFERRED EMBODIMENTS

Embodiments of the present invention are illustrated below with reference to the diagrams.

(First Embodiment)

Figure 1:
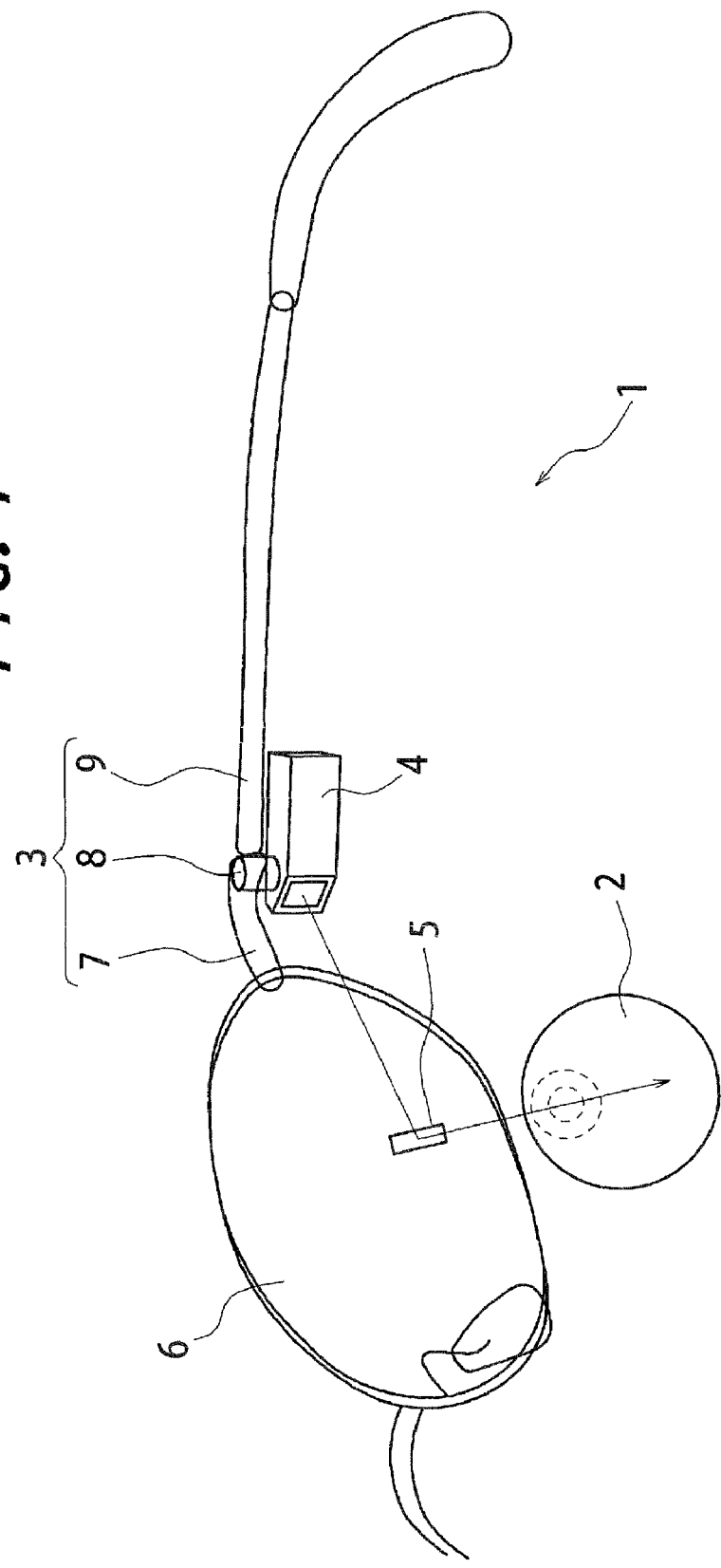
FIG. 1 is a partial block diagram schematically illustrating main parts of a spectacles-type image display device in accordance with a first embodiment of the present invention.

FIG. 1 is a partial block diagram schematically illustrating main parts of a spectacles-type image display device (spectacles-mounted display device) in accordance with a first embodiment of the present invention. In this diagram, an eyeball 2 of the right eye of a viewer when he/she wears the spectacles-type image display device 1 is also shown. As shown in the diagram, the spectacles-type image display device 1 of the present embodiment has an image output unit 4 disposed on a frame unit 3 of the spectacles and a reflection unit 5 that reflects image light that is output from the image output unit 4 toward the eyeball 2 of the viewer.

The image output unit 4 has a display element (not shown in FIG. 1) therein that displays two-dimensional images and emits image light. As a display element, general display elements such as, for example, a liquid crystal display element or an organic EL element can be used. These general display elements are known as low cost devices. In particular, when an organic EL element is used as a display element, a backlight is not needed and, thereby a compact and lightweight device requiring less power can he achieved.

The reflection unit 5 is a reflection member with a positive refractive power located adjacent to a spectacle lens and is arranged so as to reflect image light that is output from the image output unit 4 toward the eyeball 2 of the viewer to enable the viewer to see the virtual image of two-dimensional image when the viewer wears the spectacles. As shown in FIGS. 2(a) to 2(d), as a reflection unit 5, a front surface reflection mirror (FIG. 2(a)), a rear surface reflection mirror (FIG. 2(b)), a mirror embedded in a spectacle lens (FIG. 2(c)), and a total reflection prism (FIG. 2(d)) and the like can be used. As a front surface reflection mirror and a rear surface reflection mirror, a mirror whose front surface and back surface are treated respectively with a typical mirror coating such as metal deposition or dielectric multi-layered film can be used. When a mirror embedded in a spectacle lens is used, the angle of tilt can be reduced by the refraction between the spectacle lens and the air. When a total reflection prism is used, refraction can he achieved without mirror coating.

In FIG. 1, a spectacle frame 3 is fixed to a spectacle lens 6 (or a frame of the spectacle lens 6) and includes an endpiece 7 located at both ends on the front surface of the spectacles and a temple 9 foldably coupled through the endpiece 7 and a hinge 8. The image output unit 4 in accordance with the present embodiment is held by the temple 9 through the hinge 8 and folded together with the temple 9 when the spectacle frame 3 is folded.

In the above arrangement, image light that is output from the image output unit 4, reflected by the reflection unit 5 and reaches the eyeball 2 of the viewer transmits through the space surrounded by the spectacle lens 6, the spectacle frame 3 (and the viewer's face). Such configuration can reduce obstacles that block the viewer's field of vision as much as possible and allows no parts to be interfered (by the image output unit 4, for example) when the spectacle frame 3 is folded.

Figure 3:
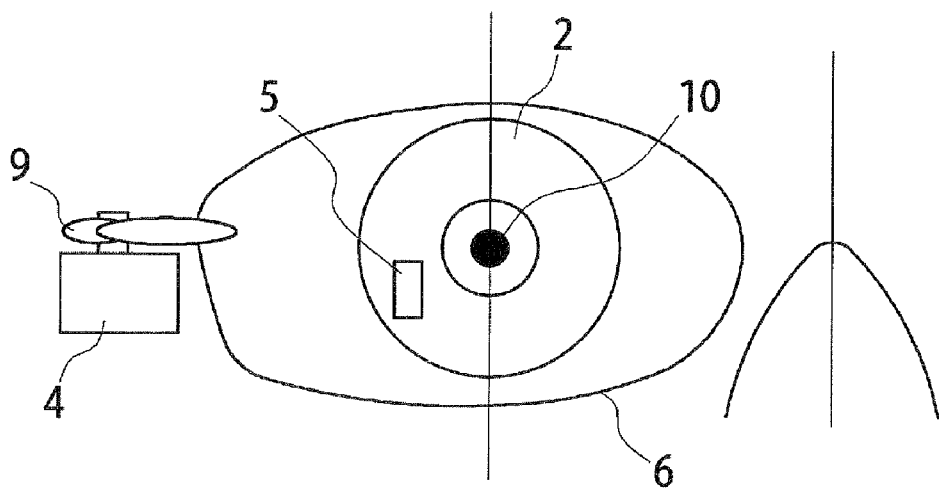
FIG. 3 is an elevation view of a right, eye side of a viewer when the viewer wears the spectacles-type image display device of FIG. 1.

FIG. 3 is an elevation view of a right eye side of a viewer when the viewer wears the spectacles-type image display device of FIG. 1. As shown in FIG. 3, in the spectacles-type image display device according to the present embodiment, for the projection cross-section with respect to the front direction of the viewer, the reflection unit 5 is disposed on a position where the reflection unit 5 does not cover a pupil 10 of the viewer. In the present embodiment, the reflection unit 5 is disposed on this position and, thereby, the field of vision of the viewer can be secured sufficiently in the normal situation (when the viewer directs more attention to the information around him/her than the information from the spectacles-type image display device). Thus the viewer can move about safely even when the viewer wears the spectacles-type image display device in accordance with the present embodiment.

In addition, as shown in FIG. 3, in the spectacles-type image display device in accordance with the present embodiment, the reflection unit 5 has a vertically-long rectangular shape. On the other hand, the image output unit 4 and the display element disposed therein have a laterally-long rectangular shape. In other words, the device is configured so that the longitudinal direction of display element 13 corresponds to the minimum width direction of the reflection unit 5 and, thereby image light can be led to the narrow space between the spectacles and the face even if the image is a laterally long display. In addition, in the spectacles-type image display device in accordance with the present embodiment, since the reflection unit 5 has the vertically-long rectangular shape, tolerance is high with respect to the vertical slippage in the state where the device is mounted. Further, if the tolerance of vertical slippage by the vertically-long reflection unit is used as an image display area, the configuration in accordance with the present embodiment can be used for the vertically-long display screen (i.e. a vertically-long display element).

Moreover, the vertically-long rectangular shaped reflection unit 5 in accordance with the present embodiment has a merit in terms of optical performance. The reflection member of the reflection unit 5 has a positive refractive power, and as shown in FIG. 1, image light that is output from the image output unit 4 is incident on the reflection unit 5 eccentrically and is reflected toward an eye pupil 10. In other words, for the reflection unit 5 in accordance with the present embodiment, eccentric aberration parallel to the incident surface is generated. However, since the reflection unit 5 in accordance with the present embodiment has the vertically-long rectangular shape (the width in a direction parallel to the incident surface is smaller), the eccentric aberration generated at the reflection unit 5 can be reduced. As to correction of the aberration, detailed explanation is given with reference to an aberration diagram in the fourth embodiment.

Figure 4:
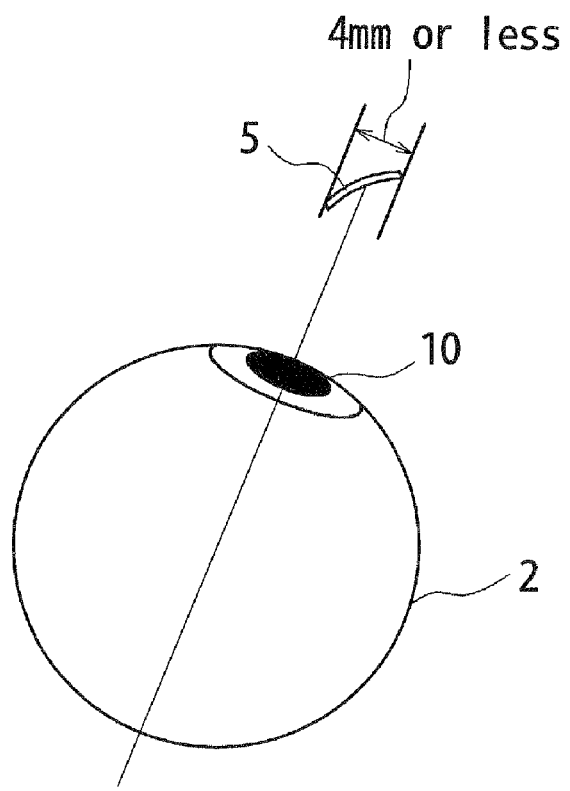
FIG. 4 is an elevation view illustrating the width in the short side direction of a rectangular reflection unit in accordance with the first embodiment of the present invention.

FIG. 4 is a diagram illustrating the width in the short side direction of a rectangular reflection unit in accordance with the present embodiment. As described hereinbefore, in the present embodiment, the image light that is output from the image output unit 4 is reflected by the reflection unit 5 and is led to the eye pupil 10 of the eyeball 2. Thus, the reflection unit 5 is disposed obliquely with respect to the line of sight of the eyeball 2 (or the optical axis of the image light that is output from the image output unit 4). In other words, for the viewer's field of vision, the size of the reflection unit 5 is different from the actual size thereof. In the present embodiment, the device is configured so that the width of the cross-section vertical to the optical axis (projection cross-section in the direction of line of sight) of the reflection unit 5 is 4 mm or less. This numerical value, 4 mm, is based on the average diameter of human pupil, and when the width of the cross-section vertical to the optical axis of the reflection unit 5 is less than 4 mm, what is called a pupil division see-through, by which background light that is not obstructed by the reflection unit 5 transmits the eye pupil 10 and forms an image on the amphiblestrode, is realized and, thereby the image light that is output from the image output unit 4 is superimposed on the background light.

Figure 5:
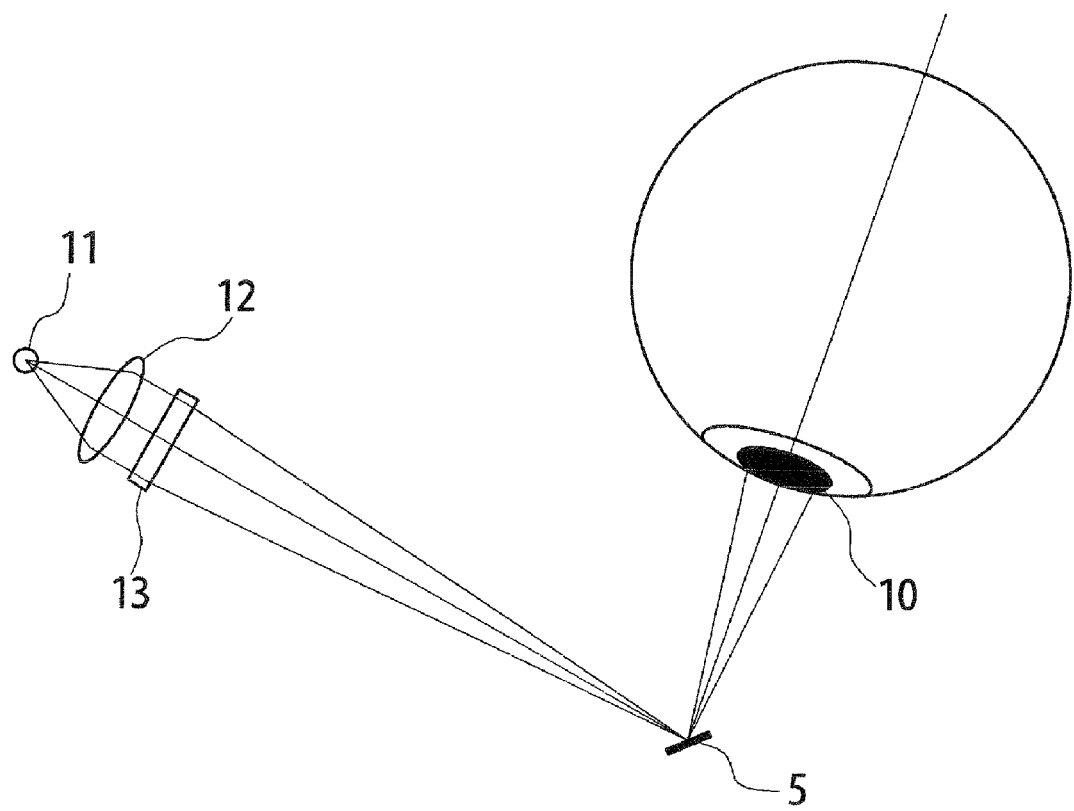
FIG. 5 is a basic block diagram showing extracted optical elements in accordance with the first embodiment of the present invention.

FIG. 5 is a basic block diagram showing extracted optical elements in accordance with the present embodiment for more detailed explanation of the optical system in accordance with the present embodiment. In the optical system in accordance with the present embodiment, as shown in FIG. 5, the illuminating light that is output from a light source 11 is converted to roughly-parallel light by an illumination lens 12 and is applied to a display element 13 (such as a liquid crystal display element). Thereafter, the display element 13 outputs image light that contains the image information, and the reflection unit 5 having a positive refractive power reflects the image light toward the eyeball and, thereby the viewer can see the virtual image of the display element 13.

As shown in FIG. 5, in the optical axis cross-section along the direction of the plane of paper of the optical system in accordance with the present embodiment, the aperture of the reflection unit 5 is the smallest. In other words, with respect to the optical axis cross-section parallel to the incident surface of the reflection surface of the reflection unit 5, the reflection unit 5 functions as a substantial aperture stop of the optical system in accordance with the present embodiment, or, it could be said that an exit pupil position exists in the reflection unit 5. In this manner, in the optical system in accordance with the present embodiment, since the reflection unit 5 is an exit pupil position, the shape of the reflection unit 5 can be determined regardless of the shape of image (i.e. the shape of display element). Thus in the present embodiment, as described hereinbefore, the reflection unit 5 can have the vertically-long rectangular shape even though the display element 13 has the laterally-long rectangular shape.

In addition, it is preferable that the device is configured so that the image of the light source 11 will be located near the reflection unit 5. According to this configuration, since the light diffused from the image of the light source 11 is reflected by the reflection unit 5 in the collected state, improved illumination efficiency can be obtained.

Figure 6:
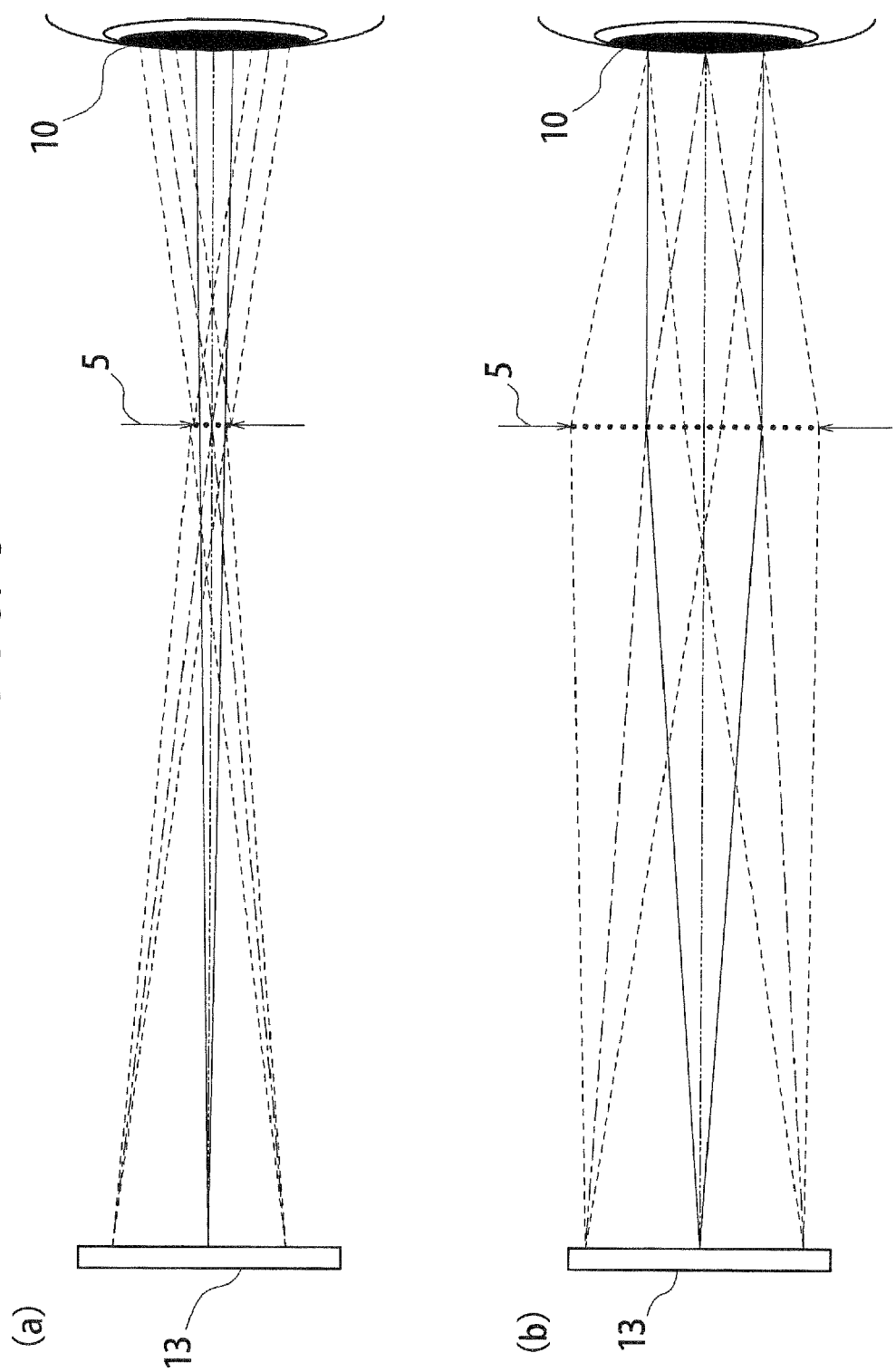
FIG. 6(a) is a ray diagram of an optical axis cross-section in the lateral direction of an optical system in accordance with the first embodiment of the present invention.
FIG. 6(b) is a ray diagram of an optical axis cross-section in the longitudinal direction of the optical system in accordance with the first embodiment of the present invention.

FIGS. 6(*a*) and 6(*b*) are diagrams illustrating the difference between tat the optical axis cross-section in the lateral direction (FIG. 6(*a*), i.e. the optical axis cross-section parallel to the incident surface of the reflection unit), and the optical axis cross-section in the longitudinal direction (FIG. 6(*b*), i.e. the optical axis cross-section perpendicular to the incident surface of the reflection unit) of an optical system in accordance with the present embodiment. It should be noted that in FIGS. 6(*a*) and 6(*b*), in order to describe on the plane of paper, light reflected by the reflection unit 5 is expressed as a straight line.

In FIGS. 6(*a*) and 6(*b*), the main light ray on the optical axis, the marginal light ray on the optical axis, the main light ray outside the axis, and the marginal light ray outside the axis are indicated respectively by two-dot chain line, solid line, chain line and dashed line. As shown in FIG. 6(*a*), in the optical system according to the present embodiment, lateral luminous flux is defined by the reflection unit 5 (in other words, the reflection unit 5 functions as an aperture stop). Therefore the marginal light ray outside the axis crosses the optical axis. On the other hand, as shown in FIG. 6(*b*), since the reflection unit 5 has a sufficiently large aperture with respect to the longitudinal direction, the reflection unit 5 has no function as a substantial aperture stop, thus the eye pupil 10 functions as an aperture stop.

It should be noted that although the spectacles-type image display device 1 illustrated by the present embodiment is configured to display electronic image to the right eye, it may be configured to display to the left eye.

(Second Embodiment)

Figure 7:
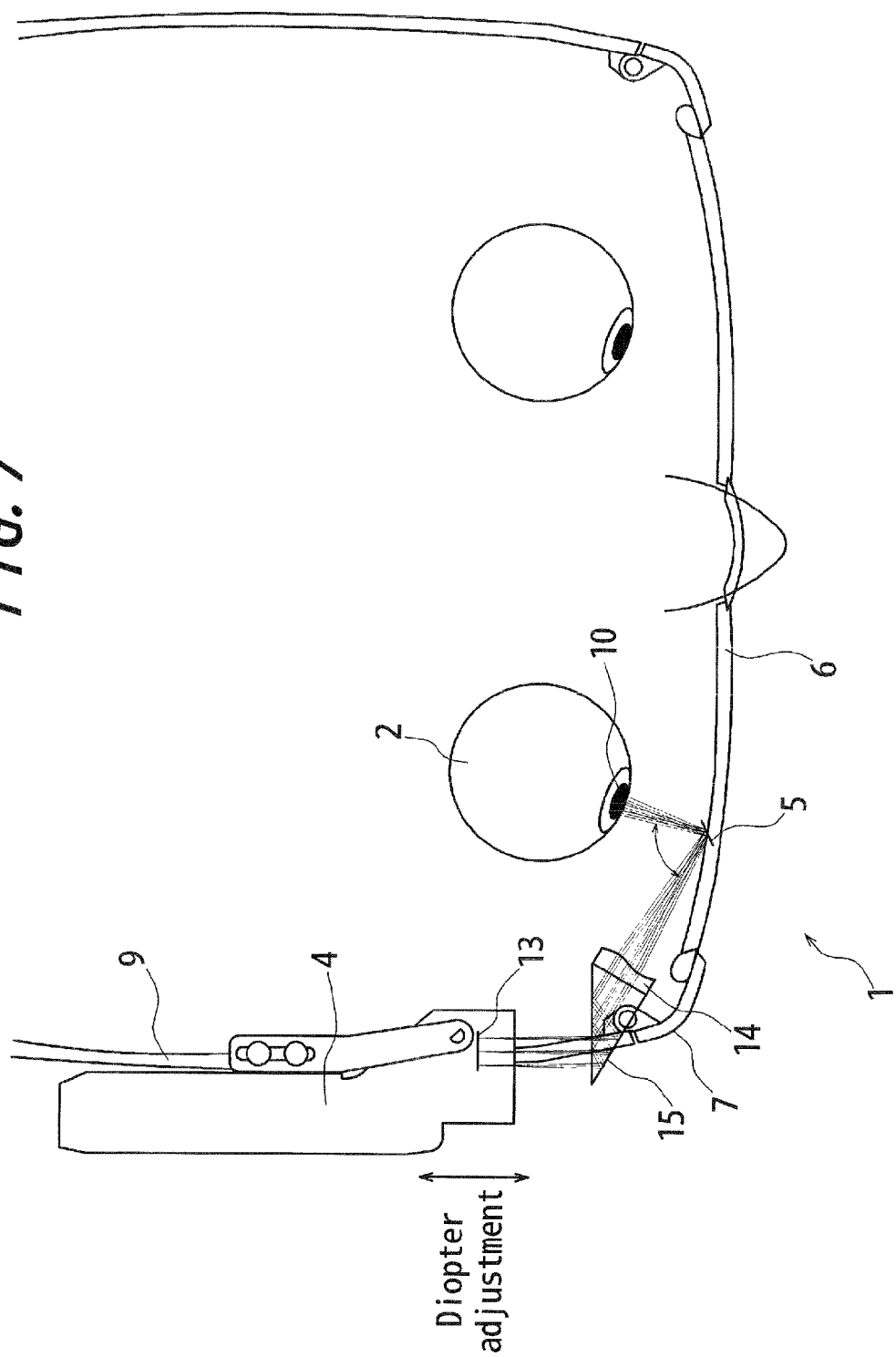
FIG. 7 is a diagram illustrating a configuration and in-use state of a spectacles-type image display device in accordance with a second embodiment of the present invention.

FIG. 7 is a block diagram schematically illustrating a spectacles-type image display device in accordance with a second embodiment of the present invention. In this diagram, an eyeball 2 of the right eye of a viewer when he/she wears the spectacles-type image display device 1 is also shown. As shown in the diagram, the spectacles-type image display device 1 in accordance with the present embodiment is provided with an image output unit 4 disposed on the temple 9 of the spectacles, a deviation prism 15 for deflecting the angle of image light that is output from the image output unit 4 and a reflection unit 5 that is disposed adjacent to the spectacle lens 6 and reflects image light that exits from a deviation prism 15 toward the eyeball 2 of the viewer.

The image output unit 4 has a display element 13 therein for displaying two-dimensional image and, outputs image light. As a display element 13, as in the case of the first embodiment, general display elements such as, for example, a liquid crystal display element and an organic EL element can be used. Thereafter, image light that is output from the display element 13 (e.g. the image output unit 4) is incident on the deviation prism 15, is deflected by 50°-70°, and exits toward the reflection unit. The reflection unit 5, which is a reflection member having a positive refractive power, magnifies image of the display element 13, and the viewer sees virtual image of the display element 13. In the embodiment shown in FIG. 7, the spectacles-type image display device has a longitudinal aberration correction lens 14 that is integrated in the deviation prism 15 and corrects aberration caused by eccentricity by the reflection unit 5.

Further, as an example of the deviation prism 15, a prism having an apex angle of 30°, 60° and 90° (what is called a 30° prism) can be used. When a 30° prism is used, deflection of 60° can be obtained by entering the image light perpendicular to a surface opposing to an apex of 90°, reflecting the image light by a surface opposing to an apex of 60°, totally reflecting the image light by a surface opposing to an apex of 90° and exiting the image light from a surface opposing to an apex of 30°.

The reflection unit 5 is a reflection member having a positive refractive power and is disposed so that, when a viewer wears the spectacles, it reflects image light that is output from the image output unit 4 toward the eyeball 2 of the viewer so that the viewer can see the virtual image of two-dimensional image. As in the case of the first embodiment, as a reflection unit 5, a front surface reflection mirror, a rear surface reflection mirror, a mirror embedded in a spectacle lens, and a total reflection prism and the like can be used (see FIGS. 2(*a*) through 2(*d*)). It should be noted that, as in the case of the first embodiment, with respect to the projection cross-section to the front direction of the viewer, the reflection unit 5 is disposed on a position where the reflection unit 5 does not cover an eye pupil 10 of the viewer (see FIG. 3). In addition, in the present embodiment, usually, disposition of the reflection unit 5 on this position allows the viewer to secure his/her field of vision sufficiently and, thereby the viewer can move about safely even when he/she wears the spectacles-type image display device in accordance with the present embodiment. Specifically, in the present embodiment, the deviation prism 15 allows the light ray to be incident on the reflection unit 5 at a sharper angle than the first embodiment and, thereby the reflection unit 5 can be disposed on the position where the field of vision is less obstructed.

In the present embodiment shown in FIG. 7, the deviation prism 15 is held by the endpiece 7 of the spectacles. Further, the image output unit 4 is held by the temple 9 of the spectacles and is movable and adjustable in the direction perpendicular to the display surface of the display element 13. With this configuration, the diopter can be adjusted by changing the distance between the display element 13 and the deviation prism 15. In addition, if the display element 13 is movable and adjustable parallel to the display surface, the interpupillary adjustment can be performed.

Figure 8:
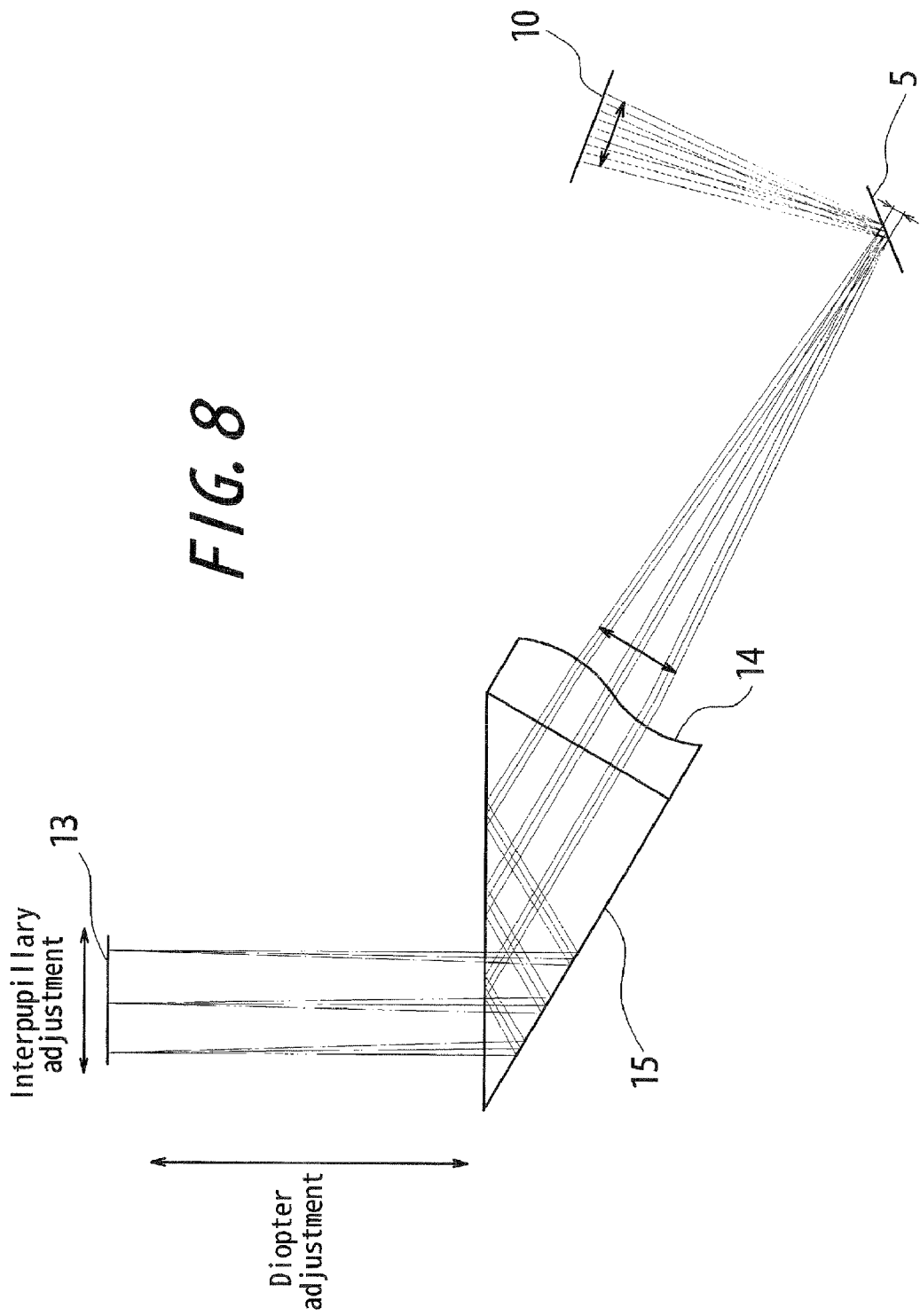
FIG. 8 is a basic block diagram showing extracted optical elements in accordance with the second embodiment of the present invention.

FIG. 8 is a basic block diagram showing extracted optical elements of the present embodiment for more detailed explanation of the optical system in accordance with the present embodiment. As shown in FIG. 8, in the optical system in accordance with the present embodiment, image light containing the image information is output from the display element 13, is deflected by the deviation prism 15 and is led to the reflection unit 5. The incident image light is reflected by the reflection unit 5 toward the eye pupil 10 of the viewer. In this case, the direction of the incident surface of the reflection unit 5 is the same as that of the plane of paper, which is substantially horizontal when it is seen from the viewer. Further, the longitudinal aberration correction lens 14 integrated in the deviation prism 15 corrects the aberration caused by the eccentricity of the reflection unit 5. As can be seen, also in the present embodiment, as in the case of the first embodiment, the luminous flux diameter of the optical axis cross-section in the direction of the plane of paper is the smallest at the reflection unit 5. In other words, also in the present embodiment, with respect to the optical axis cross-section in the direction of the incident surface, the reflection unit 5 functions substantially as an aperture stop. Thus also in the present embodiment, since the reflection unit 5 is the pupil position, the reflection unit 5 can have the vertically long rectangular shape even though the display element 13 has the laterally-long rectangular shape.

As can be seen from the basic block diagram shown in FIG. 8, in the present embodiment, the distance between the display element 13 and the reflection unit 5 changes by changing the distance between the display element 13 and the deviation prism 15 and as a result, the diopter adjustment can be performed. Further, if the display element 13 is movable and adjustable parallel to the display surface, the projection position of the display element 13 to the eye pupil 10 shifts parallel and as a result, a configuration capable of interpupillary adjustment can be obtained.

FIGS. 9(*a*) and 9(*b*) show another example of interpupillary adjustment in accordance with the present embodiment. FIG. 9(*a*) illustrates only optical elements and FIG. 9(*b*) illustrates an interpupillary adjustment mechanism.

In FIG. 9(*a*), as in the case of the optical elements shown in FIG. 8, image light containing the image information is output from the display element 13, is deflected by the deviation prism 15 and is led to the reflection unit 5. Thereafter, the reflection unit 5 reflects the incident image light toward the eye pupil 10 of the viewer. At this time, the image output units (in FIG. 9(*a*), the display element 13, the deviation prism 15 and the longitudinal aberration correction lens 14) are rotated around the reflection unit 5. As a result of this, since the viewable position on the eye pupil 10 of the viewer shifts, the interpupillary adjustment can be achieved.

According to the example of mechanism of interpupillary adjustment FIG. 9(*b*), the image output unit 4 has an arc-shaped guide 21 centered on the reflection unit 5 and through the guide 21, the image output unit 4 is held by the spectacle frame 3 and, thereby the configuration that allows the image output unit 4 to be held rotatably about the reflection unit 5 is achieved and the spectacles-type image display device capable of performing interpupillary adjustment is realized.

FIGS. 10(a) and 10(b) illustrate another example of interpupillary adjustment in accordance with the present embodiment. FIG. 10(a) illustrates only optical elements, and FIG. 10(b) illustrates an interpupillary adjustment mechanism.

As in the case of the optical elements shown in FIG. 8, in FIG. 10(a), image light containing the image information is output from the display element 13, is deflected by the deviation prism 15 and is led to the reflection unit 5. Thereafter, the incident image light is reflected by the reflection unit 5 toward the eye pupil 10 of the viewer. At this time, the reflection unit 5 is rotated about the axis that lies in the reflection surface of the reflection unit. As a result, the viewable position on the eye pupil 10 of the viewer shifts and, thereby interpupillary adjustment can he achieved.

According to the example of interpupillary adjustment mechanism shown in FIG. 10(b), a groove having a concave surface 16 is formed in the spectacle lens and further, on a part of the groove, a through hole 17 that passes through the spectacle lens is provided. With respect to the reflection unit 5, a convex surface 19 is provided as a rear face of the reflection surface 18 and a knob 20 that passes through the through hole 17 is formed. The concave surface 16 and the convex surface 19 are slidably fitted to each other and the reflection surface 18 is deflected by the knob 20 that passes through the through hole 17. With such configuration, the center of curvature of the concave surface 16 and the convex surface 19 will be the center of rotation of the reflection surface 18 and, thereby rotation about the axis that lies in the reflection surface is achieved. That is, the spectacles-type image display device capable of interpupillary adjustment can be realized.

It should be noted that although the examples of interpupillary adjustment with reference to FIGS. 9(a), 9(b), 10(a), and 10(b) are illustrated using the second embodiment, these examples can be carried out appropriately also by the first embodiment.

(Third Embodiment)

FIGS. 11(a) and 11(b) show extracted optical elements in accordance with the present embodiment for illustrating an optical system of the third embodiment that employs a toroidal mirror as a reflection member of the reflection unit 5. The configuration of the spectacles-type image display device that employs an optical system in accordance with the present embodiment can be the same, for example, as that of the second embodiment. In other words, the spectacles-type image display device 1 in accordance with the third embodiment is provided with an image output unit 4 that has a display element 13 therein and is disposed on the temple 9 of the spectacles, a deviation prism 15 for deflecting the angle of image light that is output from the image output unit 4 and a reflection unit 5 that is disposed adjacent to the spectacle lens 6 and reflects image light that exits from the deviation prism 15 toward the eyeball 2 of the viewer.

As shown in FIG. 11(a), in the optical system in accordance with the present embodiment, the light containing the image information is output from the display element 13, is deflected by the deviation prism 15 and is led to the reflection unit 5. The reflection unit 5 reflects the incident image light toward the eye pupil 10 of the viewer. As in the case of the first embodiment, also in the present embodiment, the luminous flux diameter of the optical axis cross-section in the direction along the plane of paper is the smallest at the reflection unit 5.

In other words, also in the present embodiment, with respect to the optical axis cross-section in the incident surface direction, the reflection unit 5 has a function as a substantial aperture stop. Therefore, also in the present embodiment, since the reflection unit 5 is at the pupil position, the reflection unit 5 can have the vertically-long rectangular shape even though the display element 13 has the laterally-long rectangular shape. It should be noted that FIG. 11(a) also illustrates a cover glass 22 that protects the display element 13 in the image output unit 4.

FIG. 11(b) is a diagram for illustrating the shape of reflection surface 18 of the reflection unit 5. As mentioned above, the reflection surface 18 in accordance with the present embodiment has the vertically-long rectangular shape. It should be noted that the vertically-long rectangular shape means a shape whose width in a direction parallel to the incident surface of image light is narrower than the width in a direction perpendicular to the incident surface of image light. The reflection surface 18 in accordance with the present embodiment is a toroidal surface, and has a relationship represented as Rx>Ry, wherein Ry is a curvature radius that is perpendicular to the incident surface and Rx is a curvature radius that is parallel to the incident surface. In other words, with respect to the reflection surface 18 in accordance with the present embodiment, the curvature radius in the narrow width direction is larger than that in the wide width direction. In this manner, astigmatic difference caused by eccentricity is corrected by using a toroidal mirror of the reflection surface 18. In the example shown in FIG. 11(b), the width in a direction parallel to the incident surface is 2.5 mm and the width in a direction perpendicular to the incident surface is 6.0 mm. Further, the curvature radius parallel to the incident surface is 86.7 mm and that perpendicular to the incident surface is 59.1 mm.

(Fourth Embodiment)

Figure 12:
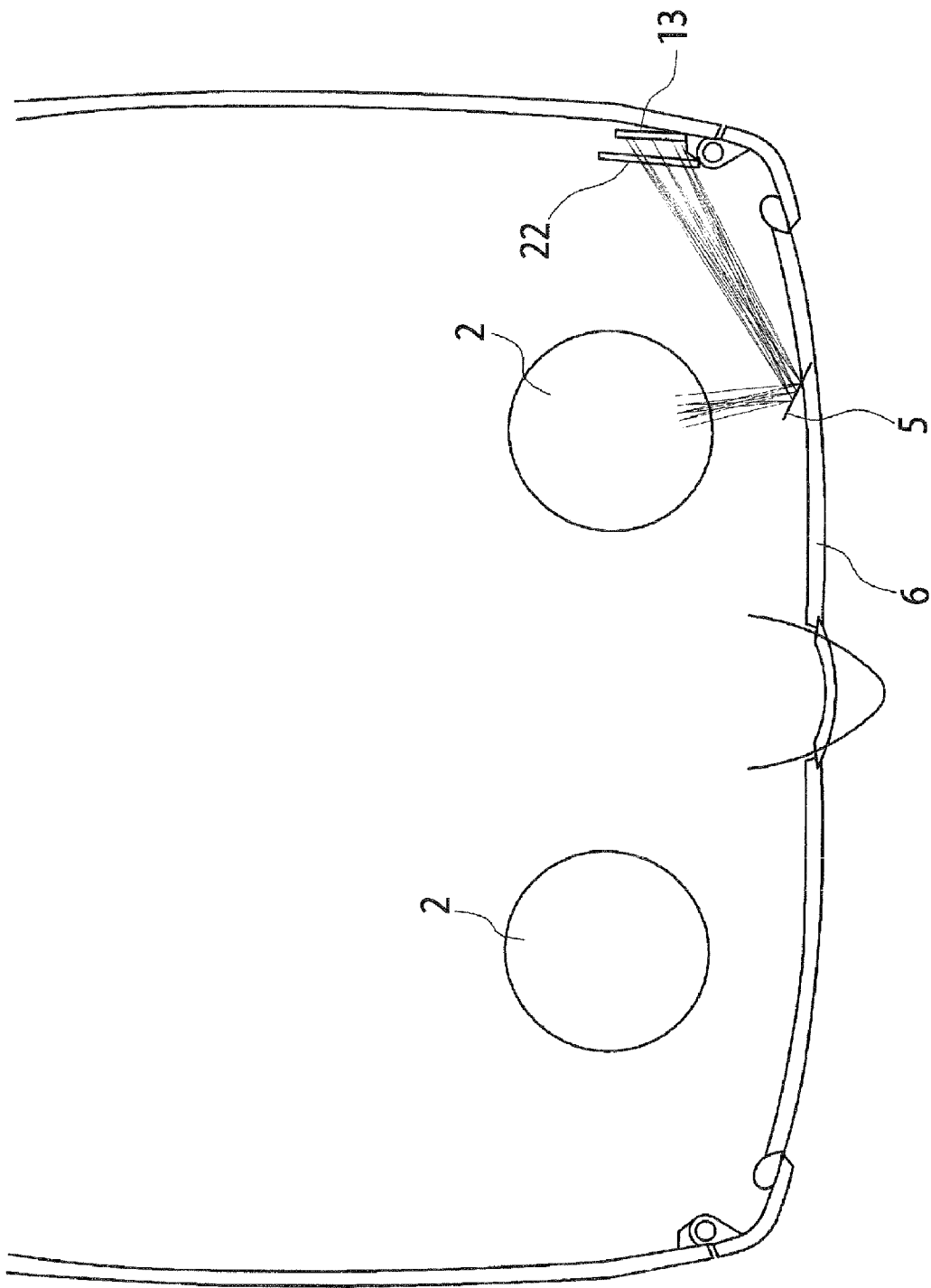
FIG. 12 is a diagram schematically illustrating a spectacles-type image display device in accordance with a fourth embodiment of the present invention.

FIG. 12 is a block diagram schematically illustrating a spectacles-type image display device in accordance with a fourth embodiment of the present invention. This diagram also illustrates an eyeball 2 of a viewer when he/she wears the spectacles-type image display device 1. As shown in the diagram, the spectacles-type image display device 1 in accordance with the present embodiment has a display element 13 disposed on a temple 9 of the spectacles and a reflection unit 5 that is disposed adjacent to the spectacle lens 6 and reflects the image light that is output from the display element 13 toward the eyeball 2 of the viewer.

In the present embodiment, a free-form surface mirror is used as a reflection member of the reflection unit 5. Further, the display element 13 is disposed obliquely with respect to the optical axis and thereby, the eccentric aberration caused by the eccentricity of the reflection unit 5 can be reduced. In addition, in the configuration of the present embodiment, the display element 13 can be disposed approximately parallel to the spectacle frame 3 by disposing the display element 13 obliquely and, thereby more compact configuration can be realized. It should be noted that, in the configuration in accordance with the present embodiment shown in FIG. 12, it is preferable to use an organic EL panel that requires no backlight as a display element 13.

Effects of the correction of eccentric aberration by disposing the display element 13 obliquely are illustrated below with reference to FIGS. 13 and 14.

Figure 13:
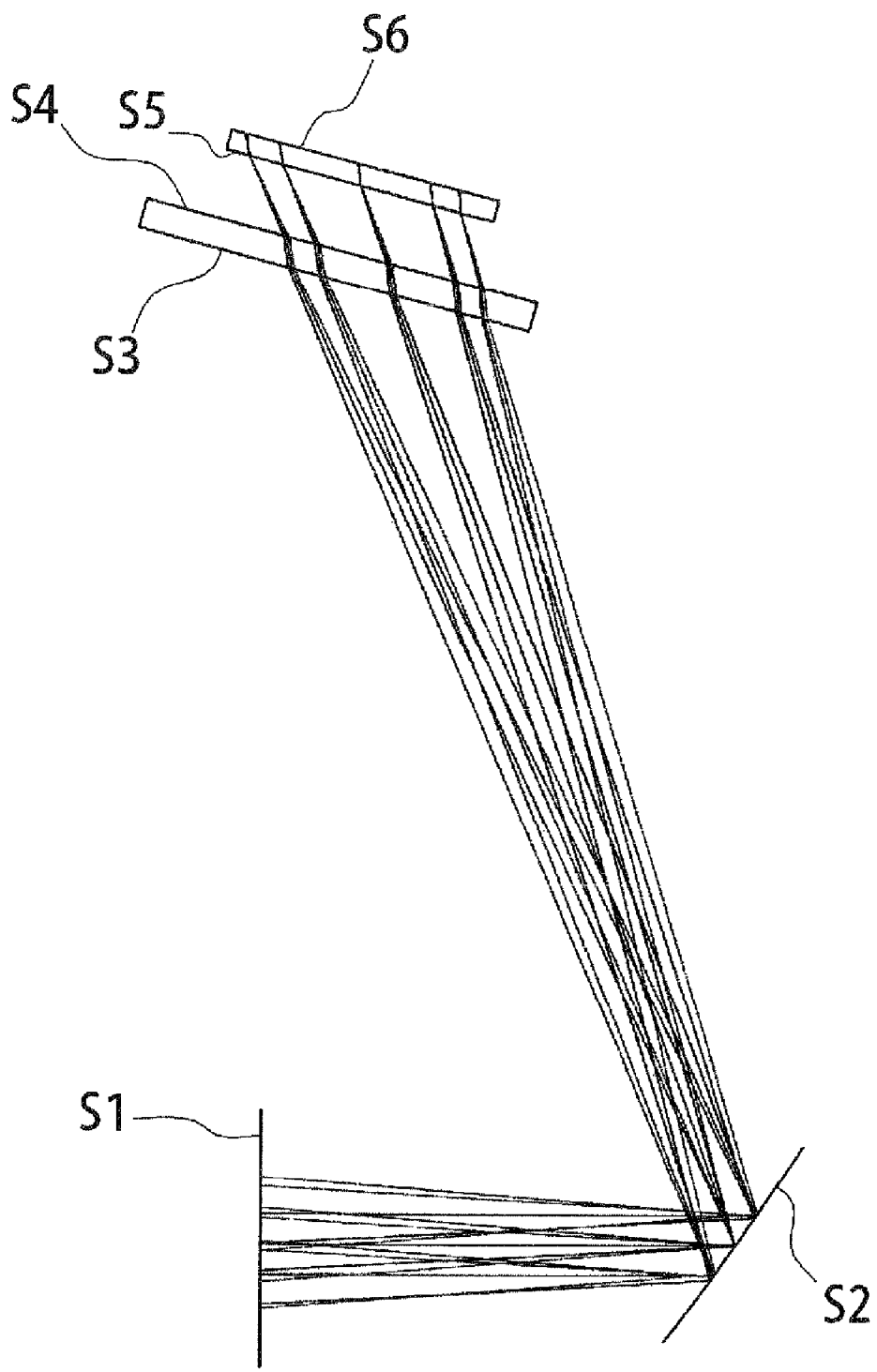
FIG. 13 is a ray diagram of an optical system in accordance with the fourth embodiment of the present invention.

FIG. 13 is a light ray diagram of the optical system in accordance with the present embodiment, which is based on the lens data shown below. FIG. 13 is a light ray diagram of reverse tracing from a virtual image surface (not shown) S0, which shows tracing from the pupil S1 to the display surface S6 of the display element in order.

(Lens Data for the Fourth Embodiment: Corresponding to FIG. 13)

| Surface No. | Curvature radius | Surface distance | Eccentricity | Refraction | Abbe No. |
|---|---|---|---|---|---|
| S0(object surface) | ∞ | −1000.00 | | | |
| S1 | ∞ | 12.00 | | | |
| S2 | FFS[1] | −34.23 | eccentricity[1] | | |
| S3 | ∞ | −1.00 | eccentricity[2] | 1.4917 | 55.3 |
| S4 | ∞ | −2.30 | | | |
| S5 | ∞ | −0.70 | | 1.5168 | 64.1 |
| S6(image surface) | ∞ | 0.00 | | | |

FFS[1]:

| C4 | −7.7508e−003 | C6 | −5.2233e−003 | C8 | −4.0470e−005 |
|---|---|---|---|---|---|
| C10 | −3.8198e−005 | C11 | −4.6443e−007 | C13 | 2.4738e−006 |
| C15 | 2.0797e−006 | C17 | −1.4429e−006 | C19 | −1.5141e−006 |
| C21 | −1.5459e−007 | | | | |

Eccentricity[1]:

| X | 0.00 | Y | 0.00 | Z | 0.00 |
|---|---|---|---|---|---|
| α | −35.00 | β | 0.00 | γ | 0.00 |

Eccentricity[2]:

| X | 0.00 | Y | −1.70 | Z | −1.30 |
|---|---|---|---|---|---|
| α | −35.00 | β | 0.00 | γ | 0.00 |

Figure 14:
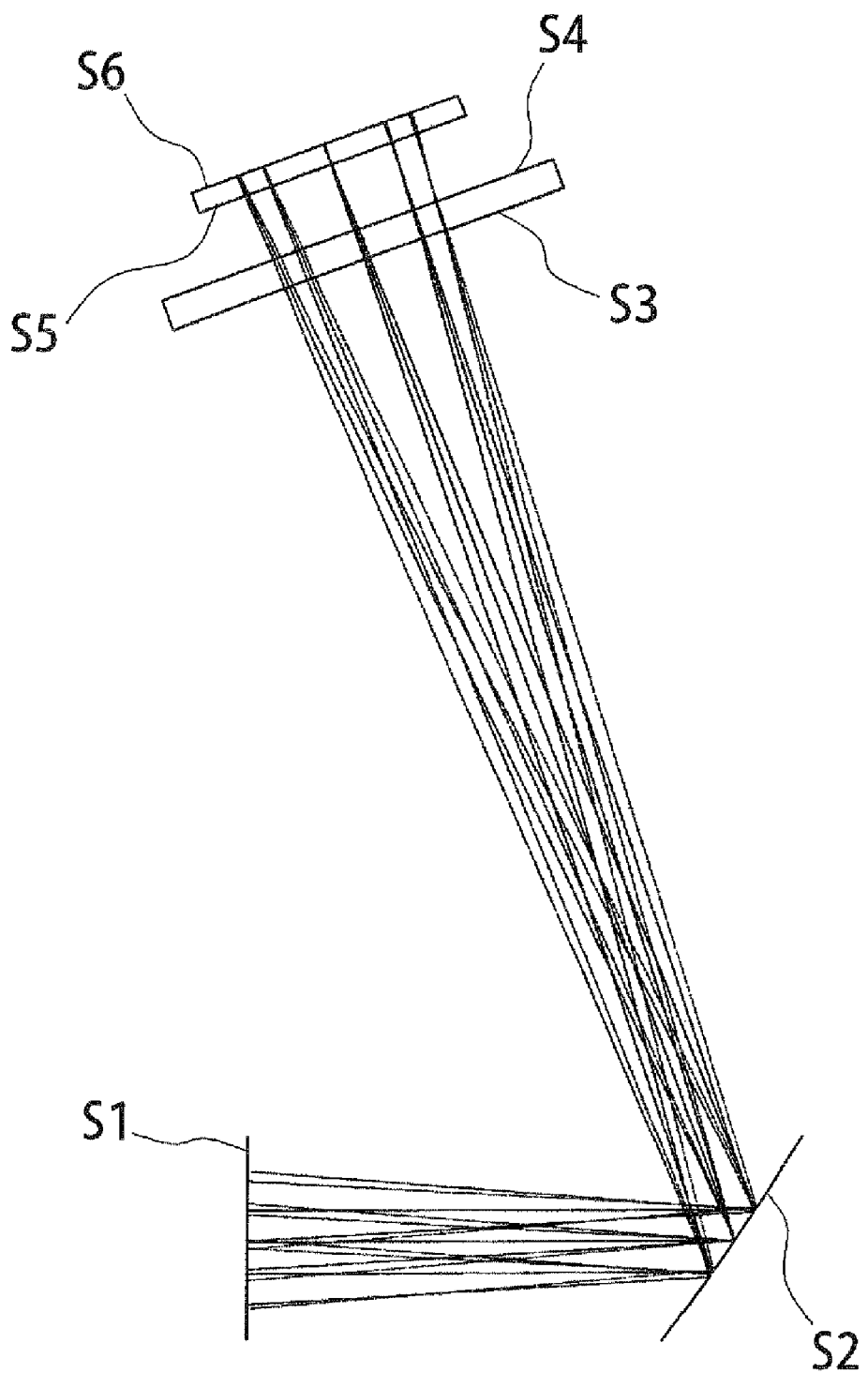
FIG. 14 is a ray diagram for comparison to show the effects of the fourth embodiment of the present invention.

FIG. 14 is a light ray diagram illustrating the state where the display element and the cover glass are not disposed obliquely to show the effects of the fourth embodiment, which is based on the lens data shown below. FIG. 14 is a light ray diagram of reverse tracing from a virtual image surface (not shown) S1, and shows tracing from the pupil S1 to the display surface S6 in order. The difference between FIG. 13 and FIG. 14 is the surfaces from the third surface S3 (top face of the cover glass) to the sixth surface S6 (display surface of the display element) that are not disposed obliquely.

(Lens Data for the Case Where the Display Element is Perpendicularly Disposed: Corresponding to FIG. 14)

| Surface No. | Curvature radius | Surface distance | Eccentricity | Refraction | Abbe No. |
|---|---|---|---|---|---|
| S0(object surface) | ∞ | −1000.00 | | | |
| S1 | ∞ | 12.00 | | | |
| S2 | FFS[1] | −34.23 | eccentricity[1] | | |
| S3 | ∞ | −1.00 | | 1.4917 | 55.3 |
| S4 | ∞ | −2.30 | | | |
| S5 | ∞ | −0.70 | | 1.5168 | 64.1 |
| S6(image surface) | ∞ | 0.00 | | | |

FFS[1]:

| C4 | −7.7508e−003 | C6 | −5.2233e−003 | C8 | −4.0470e−005 |
|---|---|---|---|---|---|
| C10 | −3.8198e−005 | C11 | −4.6443e−007 | C13 | 2.4738e−006 |
| C15 | 2.0797e−006 | C17 | −1.4429e−006 | C19 | −1.5141e−006 |
| C21 | −1.5459e−007 | | | | |

Eccentricity[1]:

| X | 0.00 | Y | 0.00 | Z | 0.00 |
|---|---|---|---|---|---|
| α | −35.00 | β | 0.00 | γ | 0.00 |

As can be seen from the comparison between FIG. 13 and FIG. 14, specifically with respect to near S6 of the sixth surface, the light ray shown in FIG. 13 is less turbulent than that shown in FIG. 14. In other words, according to the fourth embodiment of the present invention, it is understood that the eccentric aberration caused by the eccentricity of the reflection unit can be reduced by disposing the display element 13 obliquely.

Now the effects of reduction in the eccentric aberration due to the vertically long reflection member according to the present invention are described by using the free-form surface optical system in accordance with the present embodiment. It should be noted that the effects of reduction in eccentric aberration due to vertically long reflection member in accordance with the present invention is not limited to the optical system of the free-form surface mirror, and the similar effects are produced with respect to other embodiments in accordance with the present invention.

Figure 15:
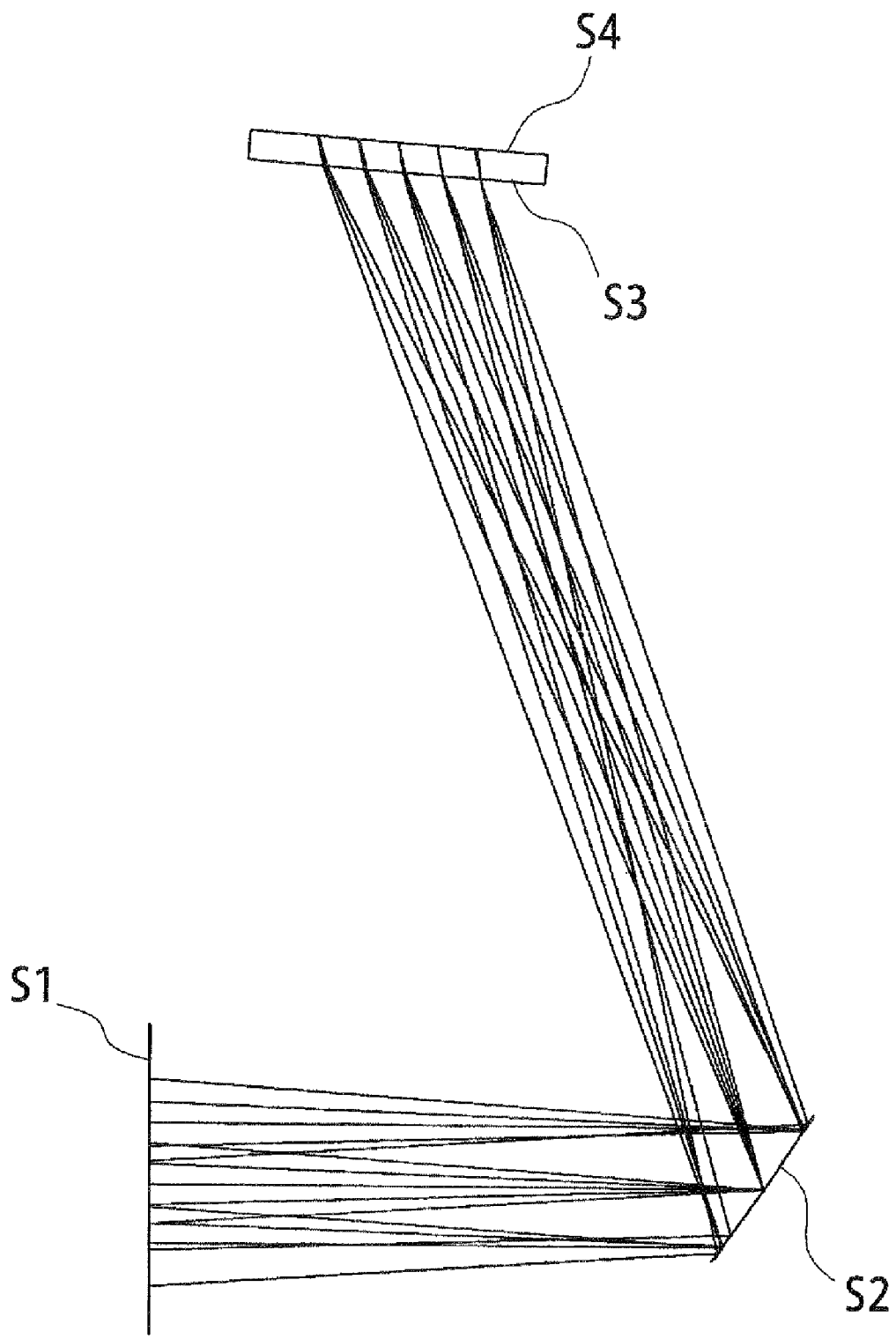
FIG. 15 is a ray diagram showing effects of reduction in eccentric aberration due to vertically long reflection member of the present invention.

FIG. 15 is a light ray diagram of the optical system with a free-form surface mirror in accordance with the present embodiment, which is based on the lens data shown below. FIG. 15 is a light ray diagram of reverse tracing from a virtual image surface (not shown) S0 and shows tracing from the pupil S1 to the display surface S6 of the display element in order. The difference between FIG. 15 and FIG. 13 is the absence of a cover glass (S3 and S4 in FIG. 13) in FIG. 15.

| Surface No. | Curvature radius | Surface distance | Eccentricity | Refraction | Abbe No. |
|---|---|---|---|---|---|
| S0(object surface) | ∞ | −1000.00 | | | |
| S1 | ∞ | 12.00 | | | |
| S2 | FFS[1] | −31.02 | eccentricity[1] | | |
| S3 | ∞ | −0.70 | eccentricity[2] | 1.5168 | 61.4 |
| S4(image surface) | ∞ | −0.00 | | | |

FFS[1]:

| C4 | −1.1279e−002 | C6 | −7.6893e−003 | C8 | −1.2511e−004 |
|---|---|---|---|---|---|
| C10 | −8.5881e−005 | C11 | −3.1333e−005 | C13 | −6.5199e−006 |
| C15 | −3.7601e−006 | C17 | −2.1593e−006 | C19 | −1.6531e−006 |
| C21 | −9.6704e−007 | | | | |

Eccentricity[1]:

| X | 0.00 | Y | 0.00 | Z | 0.00 |
|---|---|---|---|---|---|
| α | −35.00 | β | 0.00 | γ | 0.00 |

Eccentricity[2]:

| X | 0.00 | Y | −1.56 | Z | 5.21 |
|---|---|---|---|---|---|
| α | −24.30 | β | 0.00 | γ | 0.00 |

Figure 16:
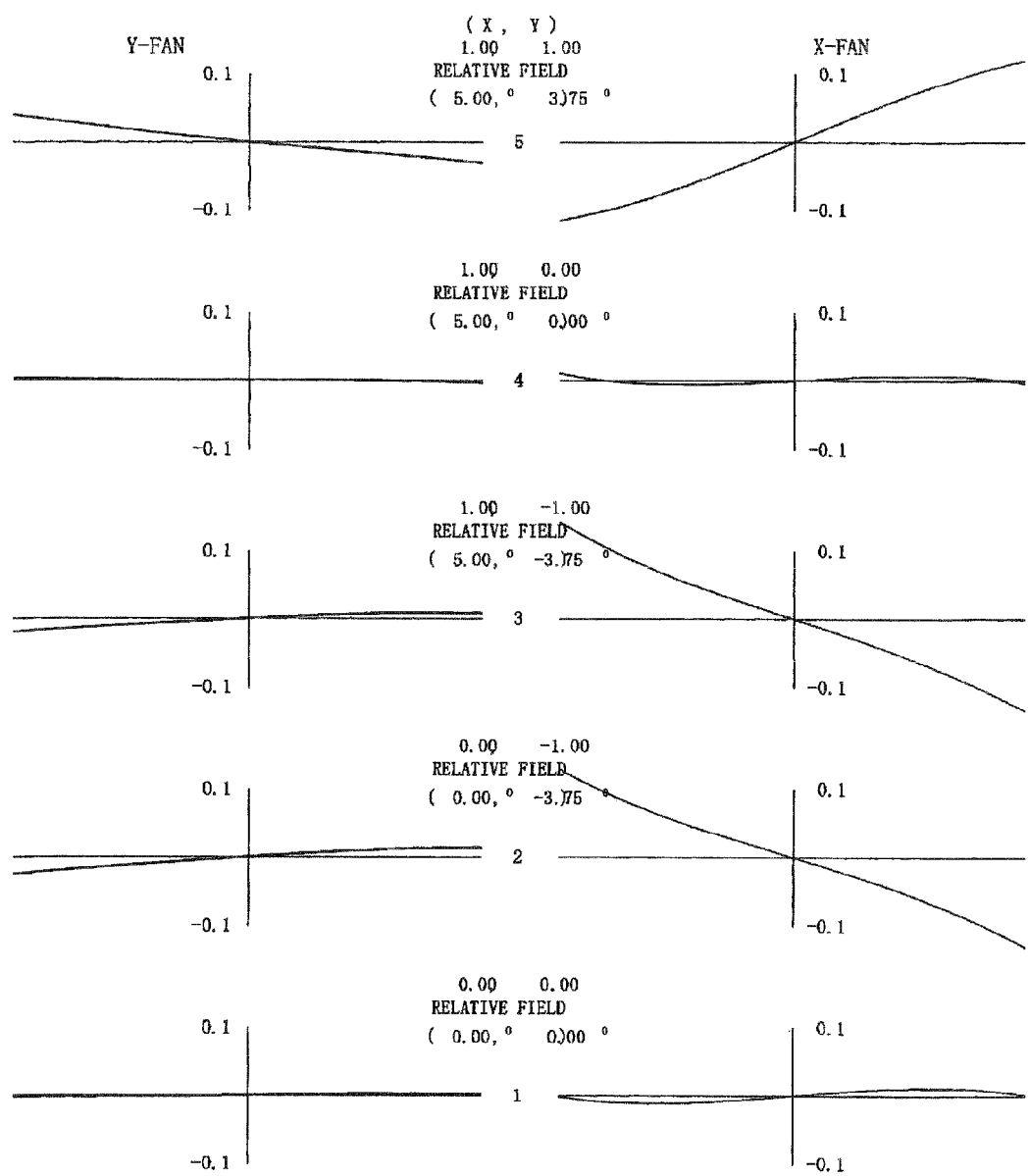
FIG. 16 is an aberration diagram when a reflection surface of a free-form surface mirror is circular.
Figure 17:
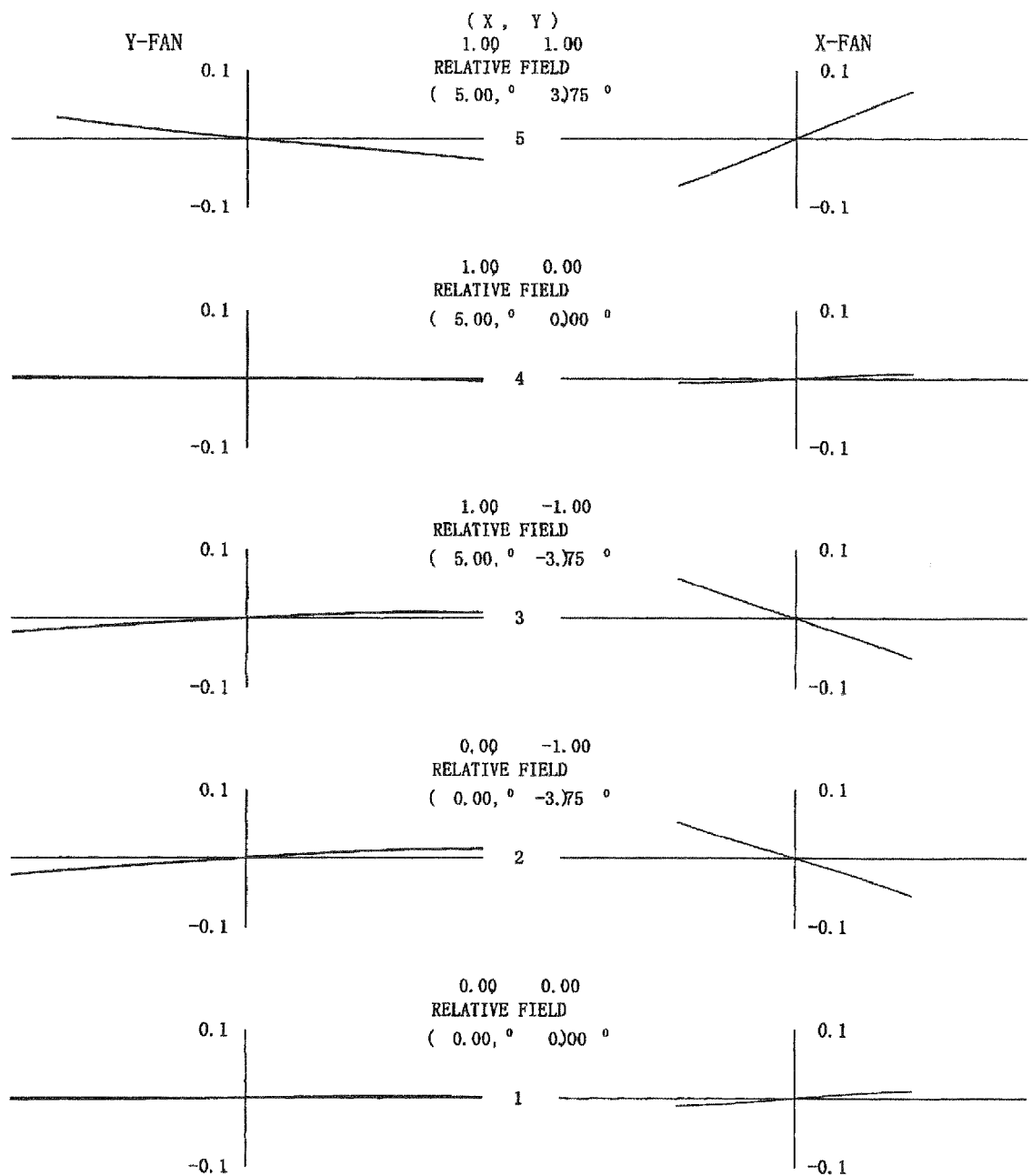
FIG. 17 is an aberration diagram when the reflection surface of the free-form surface mirror has a vertically-long rectangular shape.
Figure 18:
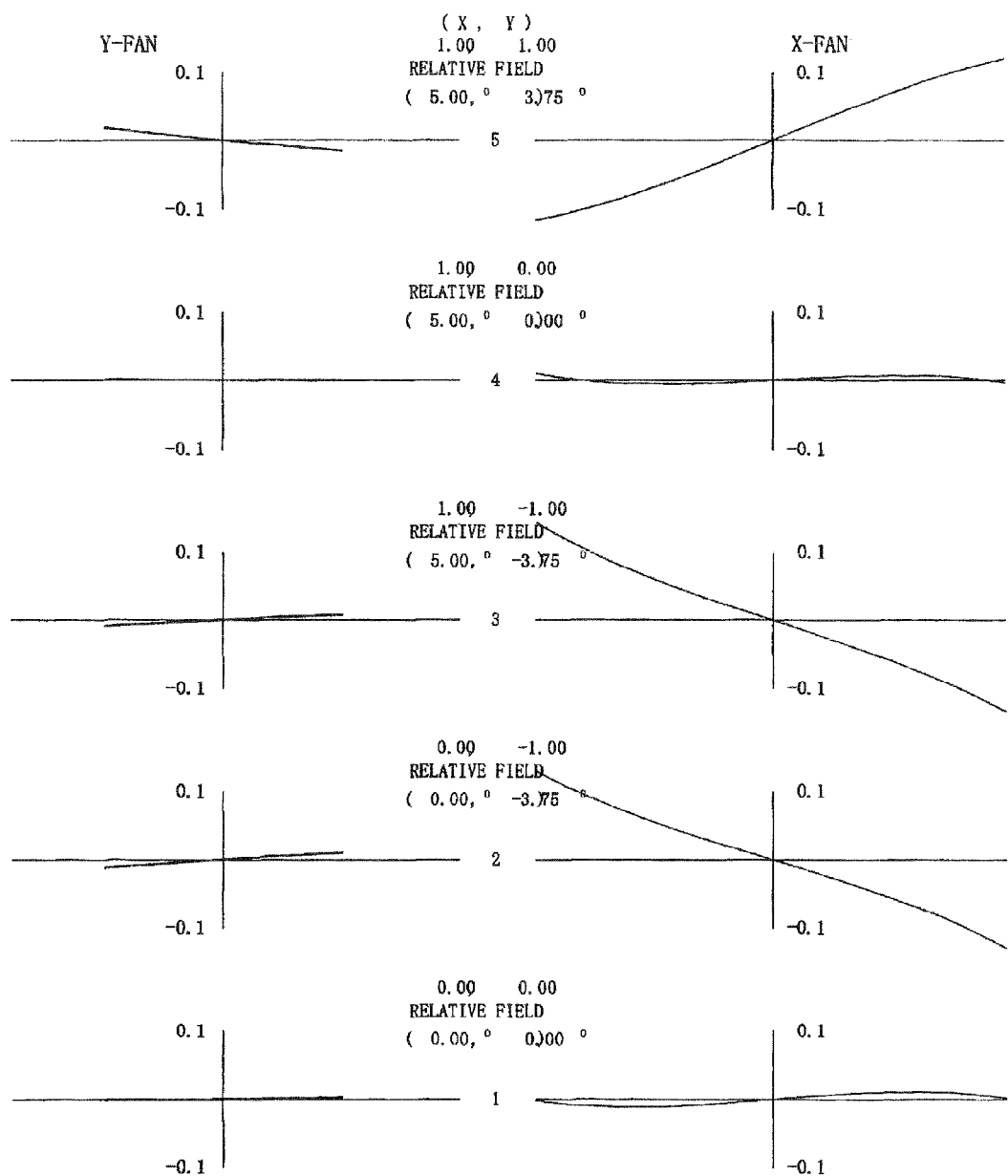
FIG. 18 is an aberration diagram when the reflection surface of the free-form surface mirror has a laterally-long rectangular shape.

For the above mentioned lens data, diagram of lateral aberration at each point of maximum image height in the cases where the shape of the second surface S2 (free-form surface mirror) is circular, vertically long and laterally long is illustrated respectively in FIGS. 16, 17 and 18. FIG. 16 is an aberration diagram where the reflection surface of the free-form surface mirror is circular with a radius of 1.74 mm, FIG. 17 is an aberration diagram where the reflection surface shape of the free-form surface mirror is rectangular with X:0.86×2 mm and Y:1.74×2 mm, and FIG. 18 is an aberration diagram where the reflection surface shape of the free-form surface mirror is rectangular with X: 1.74×2 mm and Y:0.86×2 mm, wherein X is a lateral direction (parallel to the incident surface) and Y is a vertical direction (perpendicular to the incident surface).

As can be seen from FIG. 16, for aberration according to the present optical system, the aberration in X direction is larger than that in Y direction. Therefore, if the reflection surface of the free-form surface mirror is limited to X direction, the aberration in X direction is reduced. When comparing the aberration diagram of FIG. 17 where the reflection surface of the free-form surface mirror is limited to X direction to the aberration diagram of FIG. 18 where the reflection surface of the free-form surface mirror is limited to Y direction, it is obvious that the aberration diagram of FIG. 17 obtains better correction of aberrations.

(Fifth Embodiment)

Figure 19:
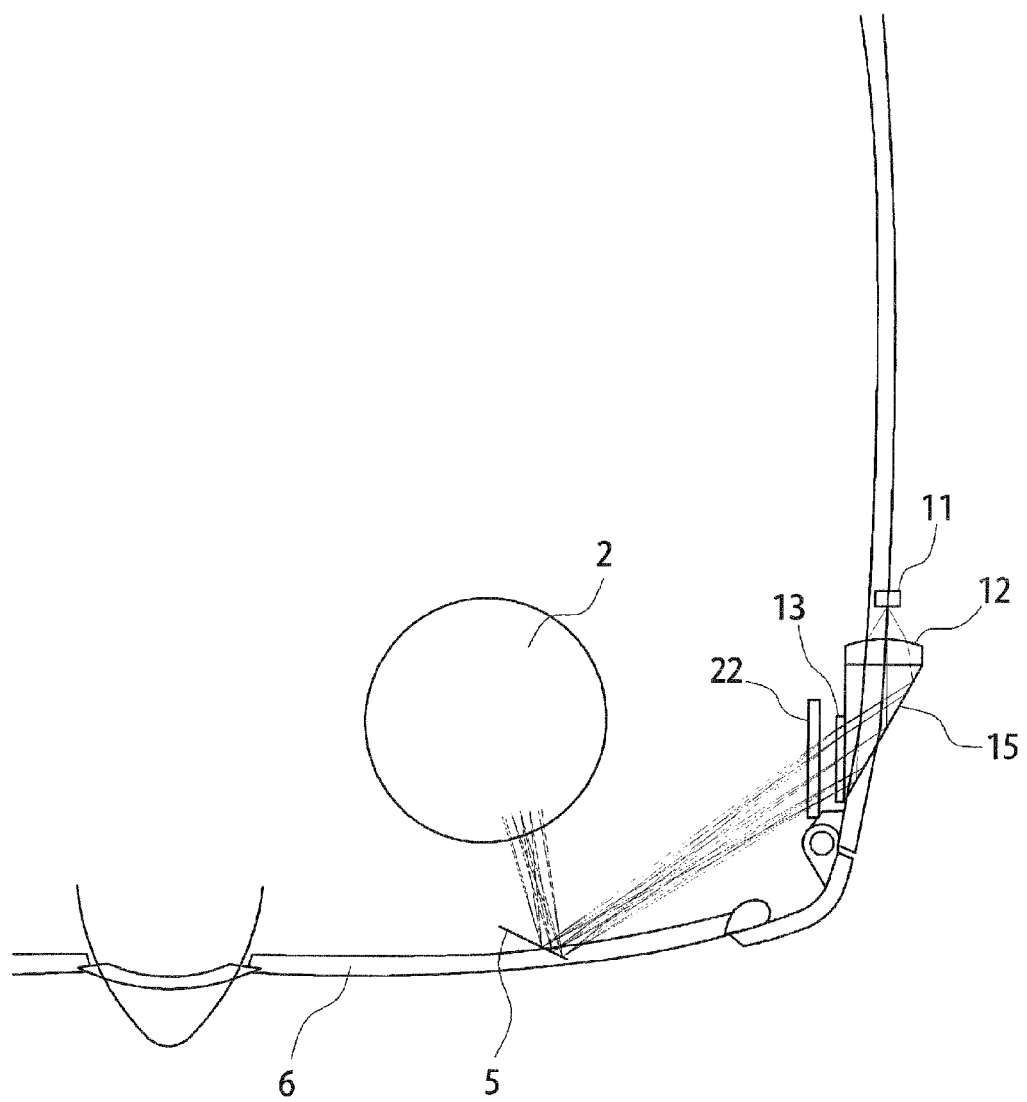
FIG. 19 is a diagram schematically illustrating a spectacles-type image display device in accordance with a fifth embodiment of the present invention.

FIG. 19 is a block diagram schematically illustrating a spectacles-type image display device in accordance with a fifth embodiment of the present invention. This diagram also illustrates an eyeball 2 of a viewer when he/she wears the spectacles-type image display device 1. As shown in the diagram, the spectacles-type image display device 1 in accordance with the present embodiment has a display element 13 disposed on a temple 9 of the spectacles and a reflection unit 5 that is disposed adjacent to the spectacle lens 6 and reflects the image light that is output from the display element 13 toward the eyeball 2 of the viewer.

Also in the present embodiment, a free-form surface mirror is used as a reflection member of the reflection unit 5. Further, the eccentric aberration caused by eccentricity of the reflection unit 5 can be reduced by disposing the display element 13 obliquely with respect to the optical axis. In addition, for the reflection surface of the reflection unit 5, eccentric aberration can be reduced further by making the width which is parallel to the incident surface smaller than the width perpendicular to the incident surface (vertically long shape).

The display element 13 in accordance with the present embodiment is a transmissive liquid crystal display element. Therefore it is required to apply the illuminating light from the backside of the display element 13. In the present embodiment, the deviation prism 15 is disposed on the backside of the display element 13 and the illuminating light from the light source 11 is folded by the deviation prism 15 and is applied to the backside of the display element 13. In addition, in terms of configuration and production, it is preferable to integrally mold a lighting lens 12 on the incident surface of the deviation prism 15 to which the illuminating light from the light source 11 is applied.

(Sixth Embodiment)

Figure 20:
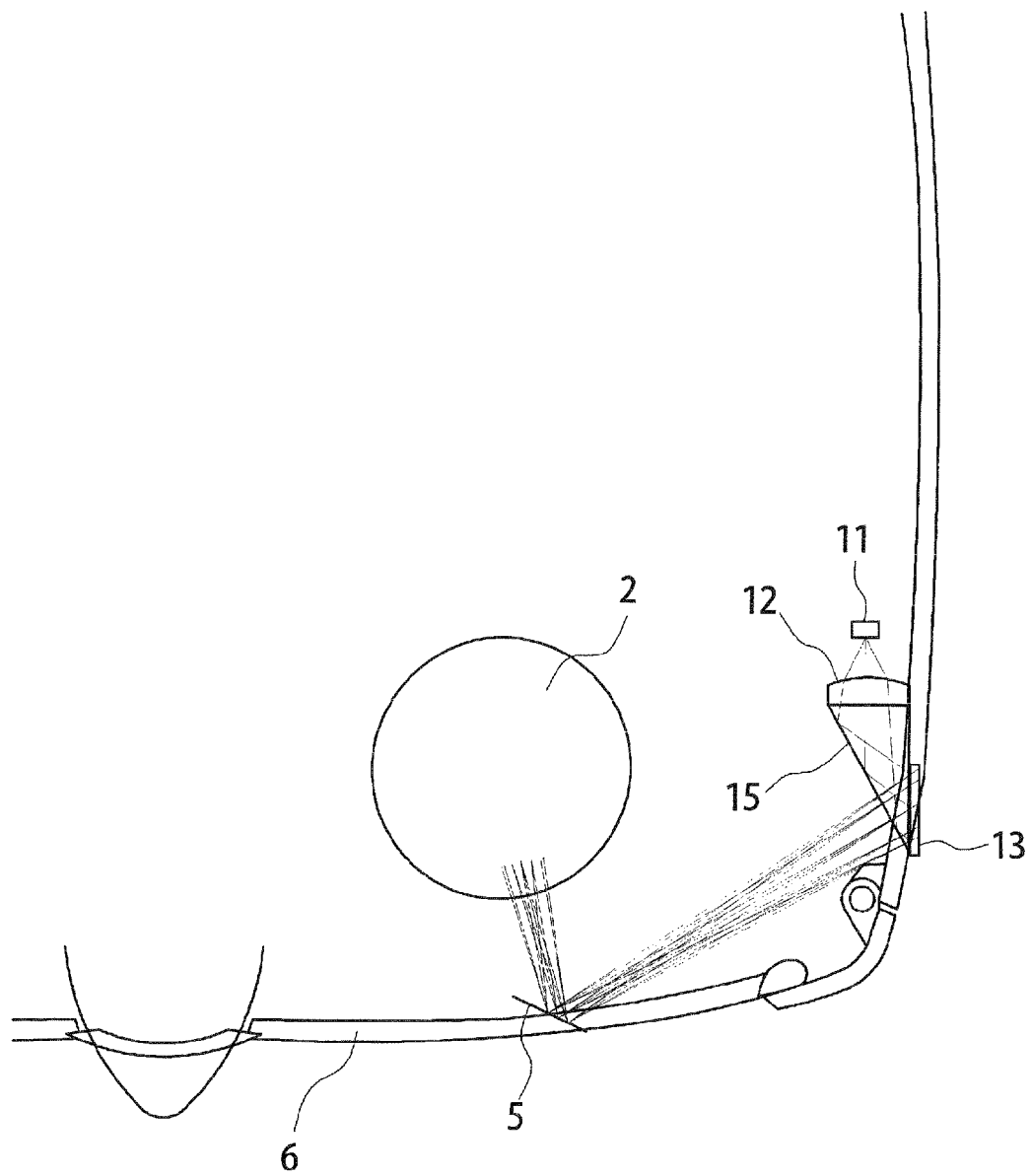
FIG. 20 is a diagram schematically illustrating a spectacles-type image display device in accordance with a sixth embodiment of the present invention.

FIG. 20 is a block diagram schematically illustrating a spectacles-type image display device in accordance with a sixth embodiment of the present invention. This diagram also illustrates an eyeball 2 of a viewer when he/she wears the spectacles-type image display device 1. As shown in the diagram, the spectacles-type image display device 1 in accordance with the present embodiment has a display element 13 disposed on a temple 9 of the spectacles and a reflection unit 5 that is disposed adjacent to the spectacle lens 6 and reflects the image light that is output from the display element 13 toward the eyeball 2 of the viewer.

Also in the present embodiment, a free-form surface mirror is used as a reflection member of the reflection unit 5. Further, the eccentric aberration caused by eccentricity of the reflection unit 5 can be reduced by disposing the display element 13 obliquely with respect to the optical axis. In addition, for the reflection surface of the reflection unit 5, eccentric aberration can be reduced further by making the width which is parallel to the incident surface smaller than the width perpendicular to the incident surface (vertically long shape).

The display element 13 in accordance with the present embodiment is a reflective display element such as an LCOS and a DMD. Therefore it is required to apply the illuminating light from the surface of the display element 13. In the present embodiment, the deviation prism 15 is disposed on the surface of the display element 13 and the illuminating light from the light source 11 is folded by the deviation prism 15 and is applied to the surface of the display element 13. In addition, in terms of configuration and production, it is preferable to integrally mold a lighting lens 12 on the incident surface of the deviation prism 15 to which the illuminating light from the light source 11 is applied.

(Seventh Embodiment)

Figure 21:
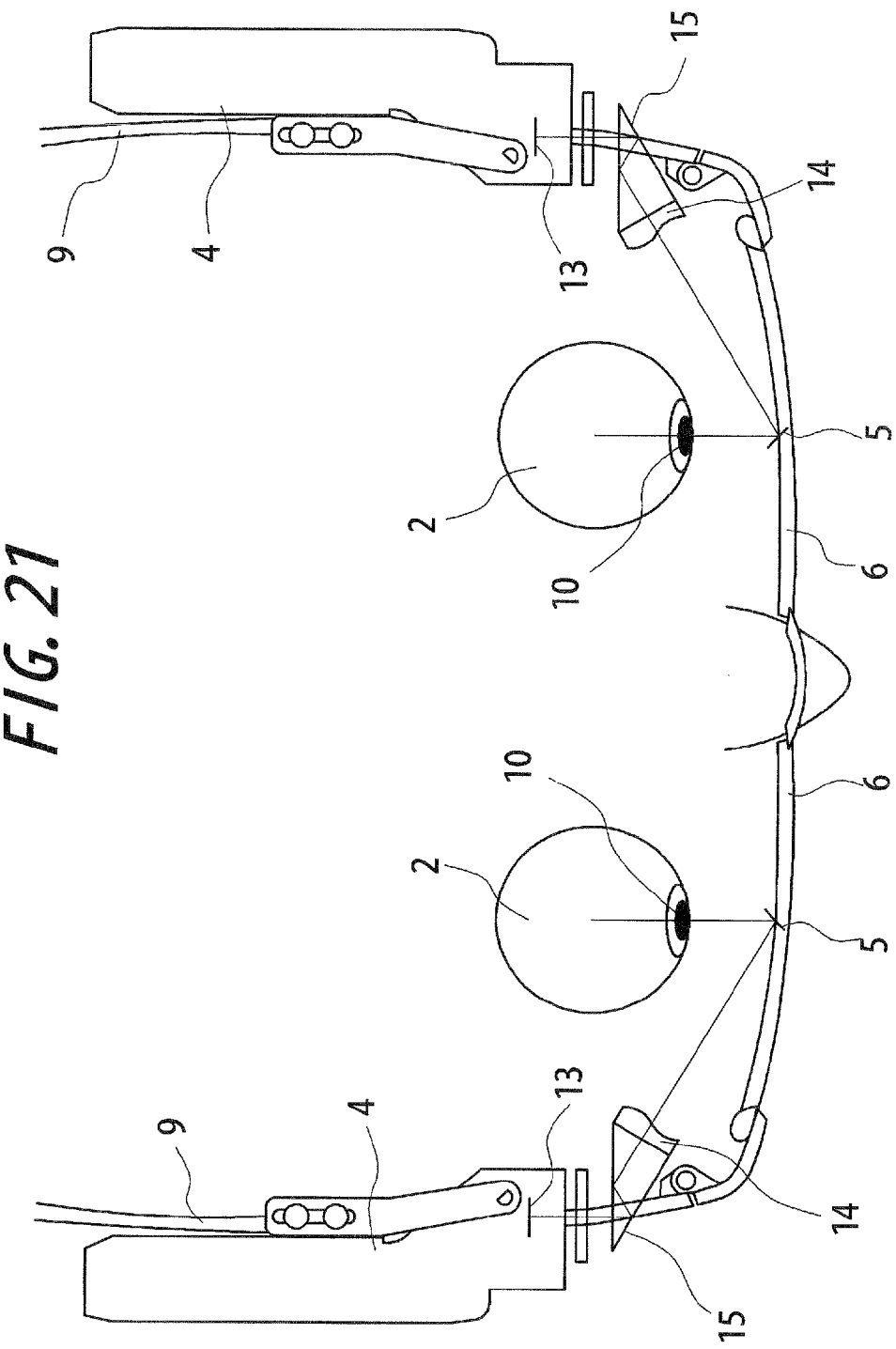
FIG. 21 is a diagram schematically illustrating a spectacles-type image display device in accordance with a seventh embodiment of the present invention.

FIG. 21 is a block diagram schematically illustrating a spectacles-type image display device in accordance with a seventh embodiment of the present invention. In the present embodiment, the use of spectacles-type image display device illustrated with reference to FIG. 7 is expanded for binocular use. In other words, the spectacles-type image display device 1 in accordance with the present embodiment is provided with image output units 4 disposed on temples 9 of the spectacles, deviation prisms 15 for deflecting the image lights that are output from the image output units 4, longitudinal aberration correction lenses 14 for correcting the vertical aberration of the image lights and reflection units 5 for reflecting image light from the longitudinal aberration correction lenses 14 toward each eyeball 2 of the viewer's right eye and left eye. Here, each function of the present embodiment is similar to that of the spectacles-type image display device in accordance with the second embodiment, thus the similar description is omitted by allocating each identical symbol in the figure. In other words, the spectacles-type image display device in accordance with the present embodiment has the functions and effects owned by the spectacles-type image display device in accordance with the second embodiment.

As shown in FIG. 21, in the present embodiment, the incidence angle of the image light is the same for the right eye and the left eye. In other words, the viewer wearing the spectacles-type image display device in accordance with the present embodiment sees one image in front of him/her. At this time, a three-dimensional image can be displayed by displaying disparity images to the right eye and the left eye. Further, a see-through display is possible by reducing the width of the reflection unit 5 in the short side direction to less than 4 mm, which is the average pupil diameter of human and, thereby a three-dimensional image can be superimposed on the background image surrounding the viewer and as a result, very realistic stereo display can be achieved. In addition, the incidence angle of the image light may be inwardly angled for the amount of the convergence of the eyeball.

It should be noted that although the present embodiment is described as an expanded use of the second embodiment, the concept of the present embodiment is not limited to the second embodiment, and other embodiments of the present invention can be also expanded to the binocular use.

(Eighth Embodiment)

Figure 22:
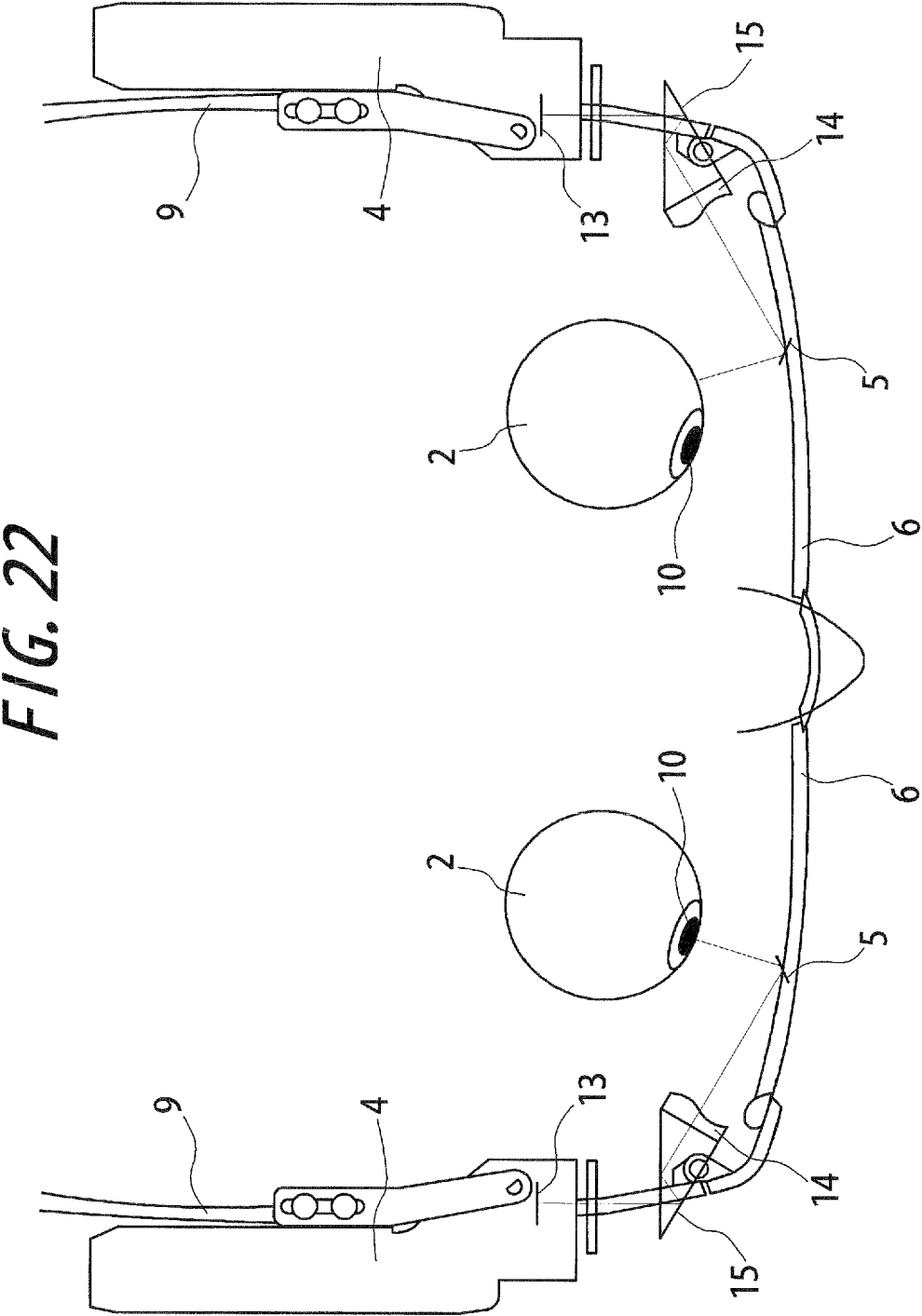
FIG. 22 is a diagram schematically illustrating a spectacles-type image display device in accordance with an eighth embodiment of the present invention.

FIG. 22 is a block diagram schematically illustrating a spectacles-type image display device in accordance with an eighth embodiment of the present invention. In the present embodiment, the use of the spectacles-type image display device in accordance with the second embodiment illustrated with reference to FIG. 7 is expanded to binocular use. In other words, the spectacles-type image display device 1 in accordance with the present embodiment is provided with image output units 4 disposed on temples 9 of the spectacles, deviation prisms 15 for deflecting the image lights that are output from the image output units 4, a longitudinal aberration correction lenses 14 for correcting the vertical aberration of the image lights and reflection units 5 for reflecting image lights that exit from the longitudinal aberration correction lenses 14 toward each eyeball 2 of the viewer's right eye and left eye. Here, each function of the present embodiment is similar to that of the spectacles-type image display device in accordance with the second embodiment, thus the similar description is omitted by allocating identical symbols respectively in the figure. In other words, the spectacles-type image display device in accordance with the present embodiment has the functions and effects owned by the spectacles-type image display device in accordance with the second embodiment.

As shown in FIG. 22, in the present embodiment, for the right eye and the left eye of the viewer, the incidence angle of the image light directs outward when seeing from the viewer side. That is, the viewer who wears the spectacles-type image display device in accordance with the present embodiment sees either one of images. At this time, the viewer can selectively see a necessary display by displaying images that are different between the right eye and the left eye. In other words, the information for the two images can be displayed by putting each image for the right eye and for the left eye together. Thus the present embodiment is suitable when the spectacles-type image display device according to the present invention is used as an information provision device.

It should be noted that although the present embodiment is described as an expanded use of the second embodiment, the concept of the present embodiment is not limited to the second embodiment and use of other embodiments can be expanded to binocular use.

(Notes on Description of Lens Data)

For the embodiments used for description of the present invention, eccentricity of each face is performed in the Y-Z surface, and the sole symmetry surface of asymmetric free-form surface of each rotation is the Y-Z surface.

For an eccentric surface, the eccentricity amount from the center of the origin of the optical system to the face top position of the surface (directions of X-axis, Y-axis and Z-axis are referred respectively as X, Y and Z) and tilt angles (respectively $\alpha$, $\beta$, $\gamma(°)$) around each central axis of the surface, that is, X-axis, Y-axis and Z-axis (for the free-form surface, Z-axis of the formula (a) shown below, for the aspheric surface, X-axis of the formula (b) shown below) are provided. In that case, each positive value of $\alpha$ and $\beta$ means counterclockwise rotation with respect to the positive direction of respective axes and positive value of $\gamma$ means clockwise rotation with respect to the positive direction of Z-axis. The central axis of the surface is rotated by $\alpha$, $\beta$ and $\gamma$ as follows: first, the central axis of the surface and the orthogonal coordinate system of X, Y and Z are rotated counterclockwise by $\alpha$ degrees around X-axis, then the central axis of the rotated surface is rotated counterclockwise by $\beta$ degrees around Y-axis of a new coordinate system and at the same time, the coordinate system that has been rotated once is rotated counterclockwise by $\beta$ degrees around Y-axis, then the central axis of the surface that has been rotated twice is rotated clockwise by $\gamma$ degrees around Z-axis of a new coordinate system.

In addition, in the optical action surface that constitutes the optical system of each embodiment, when a specific surface and a subsequent surface form a co-axial optical system (including a surface reflection prism), surface distance is provided. Other than that, medium refraction and Abbe No. are provided according to the common method.

It should be noted that the free-form surface employed by the present invention is defined by the following formula (a). Z-axis of the formula is an axis of the free-form surface.

$$Z = (r^2/R) / \left[1 + \sqrt{\{1 - (1+k)(r/R)^2\}}\right] + \sum_{j=1}^{66} C_j x^m Y^n \quad (a)$$

Wherein the initial term of the formula (a) is a spherical surface term and the second term is a free-form surface term.

In the spherical surface term,
R: Curvature Radius of the apex,
k: Korenich constant (Circular cone constant), and
$r = \sqrt{(X^2 + Y^2)}$.

In the free-form surface term, $$\sum_{j=1}^{66} C_j x^m Y^n = C_1 + C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 + C_{12} X^3 Y +$$
$$C_{13} X^2 Y^2 + C_{14} XY^3 + C_{15} Y^4 + C_{16} X^5 + C_{17} X^4 Y + C_{18} X^3 Y^2 +$$
$$C_{19} X^2 Y^3 + C_{20} XY^4 + C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 + C_{29} X^7 + C_{30} X^6 Y +$$
$$C_{31} X^5 Y^2 + C_{32} X^4 Y^3 + C_{33} X^3 Y^4 + C_{34} X^2 Y^5 + C_{35} XY^6 + C_{36} Y^7$$

provided $C_j$ (j is an integer greater than 1) is a coefficient.

In general, with respect to the above described free-form surface, both X-Z surface and Y-Z surface do not have a symmetric surface. However, in the present invention, a free-form surface having only one symmetric surface parallel to Y-Z surface can be obtained when all odd-number order terms for X are zero. For example, in the above formula (a), it is possible to obtain if the coefficient of each term of $C_2, C_5, C_7, C_9, C_{12}, C_{14}, C_{16}, C_{18}, C_{20}, C_{23}, C_{25}, C_{27}, C_{29}, C_{31}, C_{33}, C_{35}$ ... is zero.

Further, a free-form surface having only one symmetric face parallel to X-Z face can be obtained when all odd-number order terms for Y are zero. For example, in the above formula, it is possible if the coefficient of each term of $C_3, C_5, C_8, C_{10}, C_{12}, C_{14}, C_{17}, C_{19}, C_{21}, C_{23}, C_{25}, C_{27}, C_{30}, C_{32}, C_{34}, C_{36}$ ... is zero.

In addition, the rotation asymmetrical aberration caused by eccentricity can be corrected effectively and at the same time, ease of manufacturing can be improved provided that either one of the directions of the above described symmetric surfaces is defined as a symmetric surface and the eccentricity direction of the optical system is, for example, Y-axis direction with respect to the symmetric surface parallel to Y-Z surface and X-axis direction with respect to the symmetric surface parallel to X-Z face.

Further, as described hereinbefore, the formula (a) is provided as one example, and the present invention is characterized by correction of rotation asymmetrical aberration caused by eccentricity and improvement of ease of manufacturing by using a plane symmetrical free-form surface having only one symmetrical surface, and it is obvious that the same effects can he obtained with respect to any other definitional formulas.

It should be noted that the term with respect to the free-form surface for which no data is shown is zero. The refraction is for line d (wavelength: 587.56 nm). The unit of length is mm.

What is claimed is:

1. A spectacles-mounted image display device, comprising:
   an image output unit including a display element that displays an image and is disposed on a frame of spectacles; and
   a reflection unit that is disposed adjacent to at least one of spectacle lenses of the spectacles and is configured, when a viewer wears the spectacles, to reflect image light that is output from the image output unit toward an eyeball of the viewer so that the viewer can see a virtual image of the image, wherein the reflection unit is a reflection member having a positive refractive power, and wherein an effective luminous flux that is output from the image output unit and reaches the eyeball of the viewer is configured so that, in a cross section that includes an optical axis, a width of the effective luminous flux perpendicular to the optical axis is smallest at the reflection unit in comparison to widths of the effective luminous flux perpendicular to the optical axis at positions other than the reflection unit.

2. The spectacles-mounted image display device according to claim 1, wherein a smallest width of the effective luminous flux perpendicular to the optical axis in the cross section is smaller than 4 mm, which is an average human pupil diameter.

3. The spectacles-mounted image display device according to claim 1, wherein a width of a reflection surface of the reflection member in a lateral direction of the reflection member is smaller than a length of the reflection surface in a longitudinal direction of the reflection member.

4. The spectacles-mounted image display device according to claim 3, wherein the display element has a rectangular shape whose longitudinal length and lateral width are different from each other and is disposed so that a longitudinal direction of the rectangular display element corresponds to the lateral direction of the reflection member.

5. The spectacles-mounted image display device according to claim 4, wherein the reflection surface of the reflection member is represented as Rx>Ry, wherein a curvature radius in the longitudinal direction of the reflection member is Ry and the curvature radius in the lateral direction of the reflection member is Rx.

6. The spectacles-mounted image display device according to claim 4, wherein the reflection surface of the reflection member is a free-form surface.

7. The spectacles-mounted image display device according to claim 1, wherein, with respect to the effective luminous flux that is output from the image output unit and reaches the eyeball of the viewer, (i) in the cross section that includes the optical axis, which is taken along a lateral direction of the reflection member, an exit pupil position in the lateral direction is located near the reflection member, and (ii) in a cross section that includes the optical axis and is taken along a longitudinal direction of the reflection member, an exit pupil position in the longitudinal direction is located closer to a pupil of the eyeball of the viewer than the exit pupil position in the lateral direction.

8. The spectacles-mounted image display device according to claim 1, wherein the reflection member is embedded in the at least one of the spectacle lenses.

9. The spectacles-mounted image display device according to claim 1, wherein the image output unit is rotatably held with respect to a reflection surface of the reflection unit.

10. The spectacles-mounted image display device according to claim 1, wherein the reflection unit is rotatably held about a rotation axis that lies in a reflection surface of the reflection member.

11. The spectacles-mounted image display device according to claim 1, wherein a deviation prism is provided between the display element and the reflection unit.

12. The spectacles-mounted image display device according to claim 11, wherein the display element is disposed to face a forward direction of the viewer, and a light ray output from the display element is incident on the deviation prism, is deflected by 50° to 70°, and exits toward the reflection unit.

13. The spectacles-mounted image display device according to claim 11, wherein the deviation prism is held by an endpiece of the spectacles, the display element is held by a temple of the spectacles and the display element is movable in a direction perpendicular to a display surface.

14. The spectacles-mounted image display device according to claim 11, wherein the deviation prism is held by an endpiece of the spectacles, the display element is held by a temple of the spectacles and the display element is movable and adjustable in a direction parallel to a display surface.

15. The spectacles-mounted image display device according to claim 11, wherein a longitudinal aberration correction lens for correcting longitudinal aberration caused by eccentricity of the reflection unit is disposed between the display element and the reflection unit.

16. The spectacles-mounted image display device according to claim 15, wherein a surface of the longitudinal aberration correction lens is a free-form surface.

17. The spectacles-mounted image display device according to claim 15, wherein the longitudinal aberration correction lens is integrated in a deviation prism.

18. The spectacles-mounted image display device according to claim 1, wherein the display element is an organic EL element.

19. The spectacles-mounted image display device according to claim 1, wherein, for a projection cross-section with respect to a front of the viewer, the reflection unit is disposed at a position where the reflection unit does not cover a pupil of the viewer.

20. The spectacles-mounted image display device according to claim 1, wherein the cross section that includes the optical axis, in which the width of the effective luminous flux perpendicular to the optical axis is smallest at the reflection unit in comparison to widths of the effective luminous flux perpendicular to the optical axis at positions other than the reflection unit, is taken along a lateral direction of the reflection member.

21. The spectacles-mounted image display device according to claim 1, wherein the cross section that includes the optical axis, in which the width of the effective luminous flux perpendicular to the optical axis is smallest at the reflection unit in comparison to widths of the effective luminous flux perpendicular to the optical axis at positions other than the reflection unit, is taken along a substantially horizontal direction.

* * * * *